(12) United States Patent
Bai et al.

(10) Patent No.: US 12,512,896 B2
(45) Date of Patent: Dec. 30, 2025

(54) TECHNIQUES FOR SIGNALING A COMMON DOWNLINK AND UPLINK BEAM

(71) Applicant: QUALCOMM Incorporated, San Diego, CA (US)

(72) Inventors: Tianyang Bai, Somerville, NJ (US); Yan Zhou, San Diego, CA (US); Tao Luo, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 369 days.

(21) Appl. No.: 17/517,851

(22) Filed: Nov. 3, 2021

(65) Prior Publication Data

US 2022/0141862 A1    May 5, 2022

Related U.S. Application Data

(60) Provisional application No. 63/110,220, filed on Nov. 5, 2020.

(51) Int. Cl.
*H04B 7/06* (2006.01)
*H04L 1/1812* (2023.01)
*H04W 72/23* (2023.01)

(52) U.S. Cl.
CPC ....... *H04B 7/06966* (2023.05); *H04L 1/1812* (2013.01); *H04W 72/23* (2023.01)

(58) Field of Classification Search
CPC .................................................. H04W 72/23
See application file for complete search history.

(56) References Cited

U.S. PATENT DOCUMENTS

| 10,944,455 B2 | 3/2021 | Wilson et al. |
| 11,057,091 B2 | 7/2021 | Nam et al. |

(Continued)

FOREIGN PATENT DOCUMENTS

| CN | 108352960 A | 7/2018 |
| WO | 2019140256 A1 | 7/2019 |

(Continued)

OTHER PUBLICATIONS

NTT Docomo et al.: "Discussion on multi-beam operation", 3GPP Draft; R1-2009174, 3rd Generation Partnership Project (3GPP), Mobile Competence Centre ; 650, Route Des Lucioles ; F-06921 Sophia-Antipolis Cedex ; France vol. RAN WG1, No. e-Meeting; Oct. 26, 2020-Nov. 13, 2020 Oct. 24, 2020 (Oct. 24, 2020), (Year: 2020).*

(Continued)

*Primary Examiner* — Abdeltif Ajid
(74) *Attorney, Agent, or Firm* — Holland & Hart LLP

(57) ABSTRACT

Methods, systems, and devices for wireless communications are described. A user equipment (UE) may be configured to receive, from a base station, a first downlink control information (DCI) message scheduling a first transmission between the UE and the base station. The first DCI message may include an indication of a first beam associated with the first transmission and a second beam associated with a second transmission, where the second beam is associated with the first beam. The UE may then communicate with the base station via the second beam associated with the second transmission based on the first DCI message including the indication of the second beam, where the second transmission is scheduled by a second message different from the first DCI message.

28 Claims, 17 Drawing Sheets

(56) References Cited

U.S. PATENT DOCUMENTS

| | | | | |
|---|---|---|---|---|
| 2018/0309496 | A1* | 10/2018 | Lee | H04L 5/0053 |
| 2019/0356371 | A1* | 11/2019 | Osawa | H04B 7/063 |
| 2020/0314664 | A1 | 10/2020 | Zhou et al. | |
| 2022/0124782 | A1* | 4/2022 | Park | H04B 7/0404 |
| 2023/0216565 | A1* | 7/2023 | Kwak | H04B 7/088 375/267 |
| 2023/0232481 | A1* | 7/2023 | Park | H04L 5/0094 370/329 |
| 2023/0262678 | A1* | 8/2023 | Fan | H04B 7/0695 370/329 |
| 2023/0397193 | A1* | 12/2023 | Liu | H04W 52/08 |

FOREIGN PATENT DOCUMENTS

| | | | |
|---|---|---|---|
| WO | 2019160655 | | 8/2019 |
| WO | 2019165239 | | 8/2019 |
| WO | 2019182429 | A1 | 9/2019 |
| WO | 2020205600 | A1 | 10/2020 |

OTHER PUBLICATIONS

International Search Report and Written Opinion—PCT/US2021/072241—ISA/EPO—Mar. 2, 2022.

Moderator (Samsung): "Moderator Summary for Multi-Beam Enhancement", 3GPP Draft, 3GPP TSG RAN WG1 #103-e, R1-2008147, e-Meeting, Oct. 26-Nov. 13, 2020, (Nov. 13, 2020), XP051950269, 30 Pages, Retrieved from the Internet: URL: https://ftp.3gpp.org/tsg_ran/WG1_RL1/TSGR1_103-e/Docs/R1-2008147.zip [Retrieved on Nov. 3, 2020] proposal 3 . 1, p. 12 p. 13, Section 3.3, p. 25, Apple.

NTT Docomo, et al., "Discussion on Multi-Beam Operation", 3GPP Draft, 3GPP TSG RAN WG1 #103-e, R1-2009174, 3rd Generation Partnership Project (3GPP), Mobile Competence Centre, 650, Route Des Lucioles, F-06921 Sophia-Antipolis Cedex, France, vol. RAN WG1, No. e-Meeting, Oct. 26, 2020-Nov. 13, 2020, Oct. 24, 2020 (Oct. 24, 2020), XP051946879, 22 Pages, Retrieved from the Internet: URL: https://ftp.3gpp.org/tsg_ran/WG1_RL1/TSGR1_103-e/Docs/R1-2009174.zip [retrieved on Oct. 24, 2020] pp. 6,7, figures 3-1 p. 5, tables 2-1 issue 1c, p. 2.

* cited by examiner

TECHNIQUES FOR SIGNALING A COMMON DOWNLINK AND UPLINK BEAM

CROSS REFERENCE

The present Application for Patent claims the benefit of U.S. Provisional Patent Application No. 63/110,220 by BAI et al., entitled "TECHNIQUES FOR SIGNALING A COMMON DOWNLINK AND UPLINK BEAM," filed Nov. 5, 2020, assigned to the assignee hereof, and expressly incorporated by reference herein.

FIELD OF TECHNOLOGY

The following relates to wireless communications, including techniques for signaling a common downlink and uplink beam.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communications systems, both UEs and base stations may perform directional beamforming for performing uplink transmission and downlink transmissions, respectively. In some cases, beams for uplink transmissions and downlink transmissions may be configured according to different parameters, via separate signaling, or both.

SUMMARY

The described techniques relate to improved methods, systems, devices, and apparatuses that support techniques for signaling a common downlink and uplink beam. Generally, the described techniques provide signaling for common beams for improved uplink and downlink beam configuration. In particular, due to the fact that uplink and downlink beams at a user equipment (UE) are commonly adjusted or updated together, techniques described herein may be used to selectively adjust beams for multiple transmissions via a single downlink control information (DCI) message. For example, a first DCI message may schedule a downlink transmission from a base station to a UE, and may indicate a first beam (e.g., downlink beam) associated with the first transmission. The first DCI message may additionally include an indication of a second beam (e.g., uplink beam) associated with the first beam, where the second beam is associated with an uplink transmission scheduled by a second message (e.g., a second DCI message). In this example, the UE may be configured to selectively adjust (e.g., update) the first beam for receiving the downlink transmission and the second beam for transmitting the uplink transmission based on the first DCI message. Conversely, by way of another example, the first DCI message may schedule an uplink transmission and may similarly include an indication of a first beam associated with the uplink transmission and a second beam associated with a downlink transmission which was scheduled by a different message (e.g., a different DCI message).

In some aspects, the first beam and the second beam indicated by the first DCI message may include a pair of related beams used for performing downlink and uplink transmissions, respectively. Additionally or alternatively, the first and second beams may be the same beam for performing both uplink and downlink transmissions. In some cases, the first DCI message may expressly indicate the second transmission associated with the second beam which is to be adjusted or updated. In other cases, the UE may be configured to identify the second transmission associated with the second beam based on a pre-determined relationship between the first transmission and the second transmission. For instance, the second transmission may include a hybrid automatic repeat request (HARD) response for the first transmission, may be related to the first transmission via a relationship signaled by radio resource control (RRC) signaling, may be positioned within the same component carrier or bandwidth part as the first transmission, or any combination thereof. The techniques described herein may enable for multiple beams (e.g., downlink beams, uplink beams) to be adjusted with a single DCI message, which may thereby reduce control signaling overhead and improve resource utilization in the wireless communications system.

DETAILED DESCRIPTION

Figure 1:
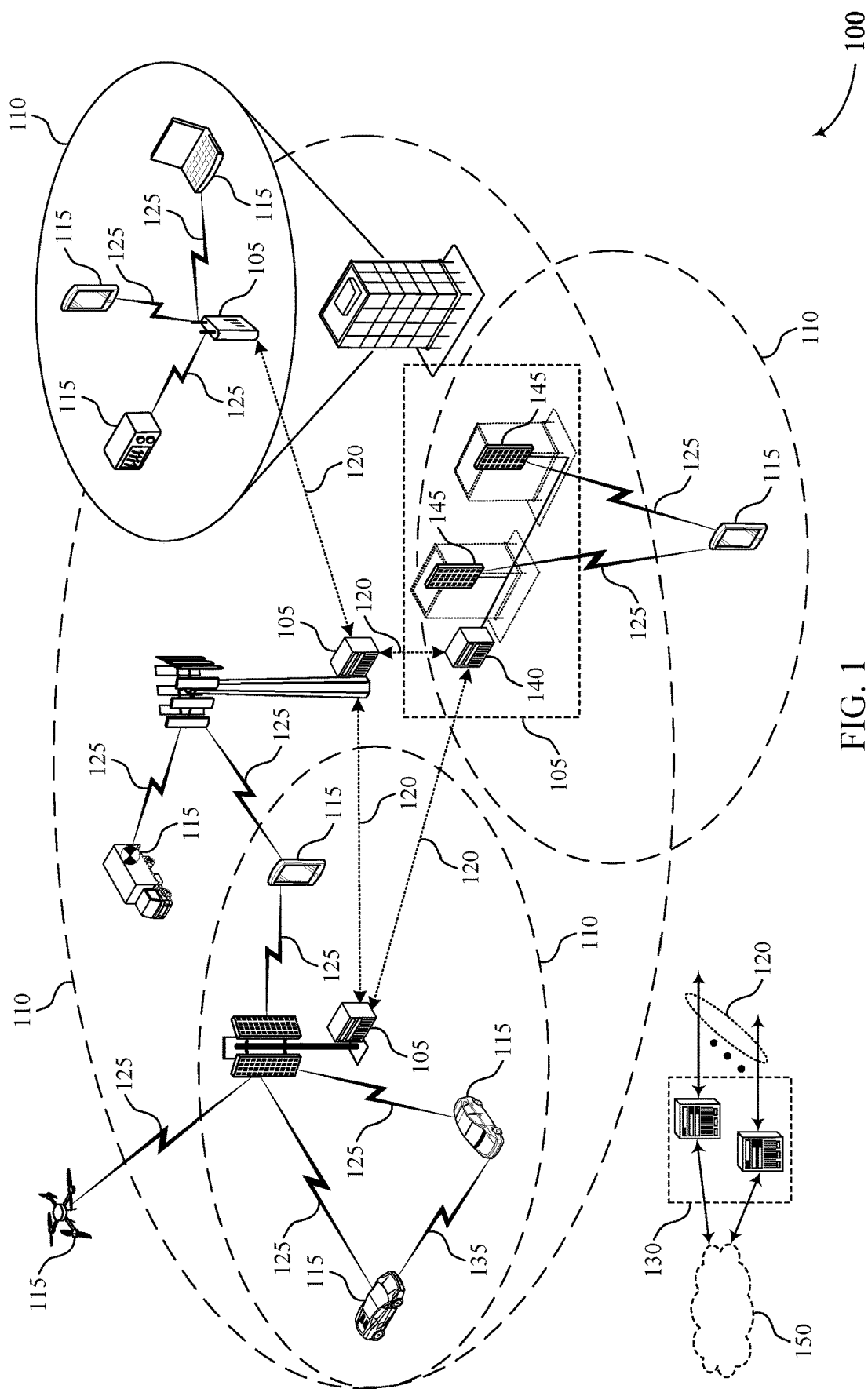
FIG. 1 illustrates an example of a wireless communications system that supports techniques for signaling a common downlink and uplink beam in accordance with aspects of the present disclosure.

In some wireless communications systems, both user equipments (UEs) and base stations may perform directional beamforming for performing uplink transmission and downlink transmissions, respectively. In some cases, beams for uplink transmissions and downlink transmissions may be configured according to different parameters. For example, beams for downlink transmissions may be configured based on transmission configuration indication (TCI) states, whereas beams for uplink transmissions may be configured based on spatial relationship information (e.g., spatial filters). In this regard, the beams used for uplink transmissions (e.g., uplink beams) and downlink transmissions (e.g., downlink beams), respectively, may be configured via separate signaling between the base station and the UE. This separate signaling used to separately configure the uplink beams and the downlink beams may result in increased network overhead and inefficient use of resources within the wireless communications system.

To enable for improved uplink and downlink beam configuration, techniques described herein are directed to signaling for common uplink and downlink beams. In particular, due to the fact that uplink and downlink beams at a UE are commonly adjusted or updated together, techniques herein may be used to selectively adjust beams for multiple transmissions via a single downlink control information (DCI) message. For example, a first DCI message may schedule a downlink transmission from a base station to a UE, and may indicate a first beam (e.g., downlink beam) associated with the first transmission. The first DCI message may additionally include an indication of a second beam (e.g., uplink beam) associated with the first beam. In some cases, the second beam is associated with an uplink transmission and may be scheduled by a second message (e.g., a second DCI message). In this example, the UE may be configured to selectively adjust (e.g., update) the first beam for receiving the downlink transmission and the second beam for transmitting the uplink transmission based on the first DCI message. Conversely, by way of another example, the first DCI message may schedule an uplink transmission and may similarly include an indication of a first beam associated with the uplink transmission and a second beam associated with a downlink transmission which was scheduled by a different DCI message.

In some aspects, the first beam and the second beam may include a pair of related beams used for performing downlink and uplink transmissions, respectively. Additionally or alternatively, the first and second beams may be the same beam for performing both uplink and downlink transmissions. In some cases, the first DCI message may expressly indicate the second transmission associated with the second beam which is to be adjusted or updated. In other cases, the UE may be configured to identify the second transmission associated with the second beam based on a pre-determined relationship between the first transmission and the second transmission. For instance, the second transmission may include a hybrid automatic repeat request (HARD) response for the first transmission, may be related to the first transmission via a relationship signaled by radio resource control (RRC) signaling, may be positioned within the same component carrier or bandwidth part as the first transmission, or any combination thereof.

By enabling for multiple beams (e.g., downlink beam, uplink beam) to be signaled and configured via a single DCI message, the techniques described herein may reduce the signaling required to configure the respective beams as compared to wireless communications systems which configure the beams separately. In this regard, techniques described herein may thereby reduce control signaling overhead and improve resource utilization in the wireless communications system. Moreover, due to the fact that downlink and uplink beams are generally updated in tandem as the relative positioning of the UE changes with respect to the base station, techniques described herein may improve the speed and efficiency with which beams may be updated, thereby improving the efficiency of wireless communications within the wireless communications system.

Aspects of the disclosure are initially described in the context of wireless communications systems. Additional aspects of the disclosure are described in the context of an example process flow and an example architecture that supports common beam configuration. Aspects of the disclosure are further illustrated by and described with reference to apparatus diagrams, system diagrams, and flowcharts that relate to techniques for signaling a common downlink and uplink beam.

FIG. 1 illustrates an example of a wireless communications system 100 that supports techniques for signaling a common downlink and uplink beam in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$, may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some aspects, the UEs 115 and the base stations 105 of the wireless communications system 100 may support techniques for common beam configuration to improve uplink and downlink beam configuration. In particular, due to the fact that uplink and downlink beams at the UE 115 are commonly adjusted or updated together as the UE 115 moves relative to the base station 105, techniques herein may be used to selectively adjust beams for multiple transmissions via a single DCI message. For example, the base station 105 may transmit a first DCI message to the UE 115, where the first DCI message schedules a downlink transmission from the base station 105 to the UE 115 and indicate a first beam (e.g., downlink beam) associated with the first transmission. In some aspects, the first DCI message may additionally include an indication of a second beam (e.g., uplink beam) associated with the first beam, where the second beam is associated with an uplink transmission. In some cases, the uplink transmission may be scheduled by a second message. (e.g., a second DCI message). In some cases, the uplink transmission may be scheduled as part of a configured grant. In this example, the UE 115 may be configured to selectively adjust (e.g., update) the first beam for receiving the downlink transmission and the second beam for transmitting the uplink transmission based on the first DCI message. Conversely, by way of another example, the first DCI message may schedule an uplink transmission and may similarly include an indication of a first beam associated with the uplink transmission and a second beam associated with a downlink transmission which was scheduled by a different DCI message.

In some aspects, the first beam and the second beam may include a pair of related beams used for performing downlink and uplink transmissions, respectively. Additionally or alternatively, the first and second beams may be the same beam for performing both uplink and downlink transmissions. In some cases, the first DCI message may expressly indicate the second transmission associated with the second beam which is to be adjusted or updated. In other cases, the UE 115 may be configured to identify the second transmission associated with the second beam based on a predetermined relationship between the first transmission and the second transmission. For example, the UE 115 and/or base station 105 may identify the second transmission based on the second transmission including a HARQ response for the first transmission. By way of another example, the UE 115 and/or base station 105 may identify the second transmission based on a relationship between the first transmission and the second transmission which is configured via control signaling (e.g., RRC signaling). By way of yet another example, the UE 115 and/or the base station 105 may identify the second transmission based on the second transmission being positioned within a common set of resources (e.g., common component carrier, common component carrier group, common BWP, common BWP group) as the first transmission.

The techniques described herein may provide signaling which enables multiple beams (e.g., downlink beams, uplink beams) to be configured and/or adjusted via a single control message (e.g., DCI message). In particular, according to aspects described herein, a single DCI message may be configured to adjust and/or configure a beam associated with a transmission scheduled by the DCI message, as well as one or more additional beams associated with the first beam. In this regard, techniques described herein may enable a single DCI message to configure and/or adjust beams associated with transmissions which are scheduled by different DCI messages. By providing for multiple beams to be configured according to a single control message (e.g., DCI message), techniques described herein may reduce control signaling overhead and improve resource utilization in the wireless communications system 100.

Figure 2:
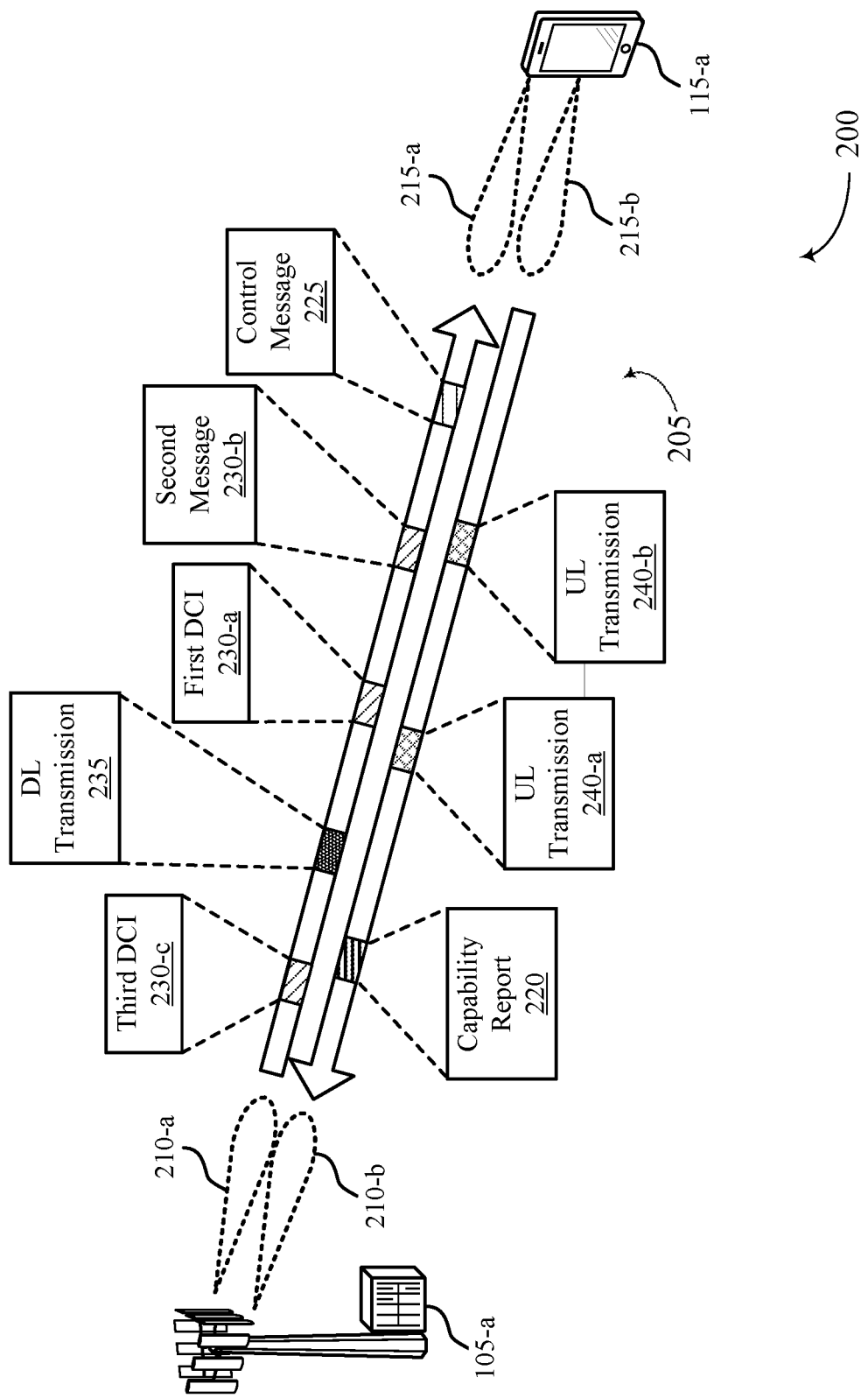
FIG. 2 illustrates an example of a wireless communications system that supports techniques for signaling a common downlink and uplink beam in accordance with aspects of the present disclosure.

FIG. 2 illustrates an example of a wireless communications system 200 that supports techniques for signaling a common downlink and uplink beam in accordance with aspects of the present disclosure. In some examples, wireless communications system 200 may implement aspects of wireless communications system 100. The wireless communications system 200 may include a UE 115 a and a base station 105-a, which may be examples of UEs 115 and base stations 105, as described with reference to FIG. 1.

In some aspects, the UE 115-a and the base station 105-a may communicate with one another via a communication link 205. In some aspects, the communication link 205 may include an example of an access link (e.g., Uu link). The communication link 205 may include a bi-directional link that can include both uplink and downlink communication. For example, the UE 115-a may transmit uplink transmissions 240, such as uplink control signals or uplink data signals, to the base station 105-a using the communication link 205, and the base station 105-a may transmit downlink transmissions 235, such as downlink control signals or downlink data signals, to the UE 115-a using the communication link 205. In some aspects, the wireless communications system 200 may support wireless communications with wireless devices (e.g., UE 115-a) via one or more serving cells of the wireless communications system 200. Each serving cell may be supported by one or more base stations 105 of the wireless communications system 200.

In some aspects, the UE 115-a and the base station 105-a may communicate with one another using one or more beams, one or more carriers, one or more communications links, or any combination thereof. In some aspects, the UE 115-a and the base station 105-a may communicate with one another via a beam pair links including uplink beams and a downlink beams. For example, the base station 105-a may transmit downlink transmissions 235 to the UE 115-a via a first beam 210-a (e.g., downlink beam 210-a), and the UE 115-a may receive downlink transmissions 235 via a first beam 215-a (e.g., downlink beam 215-a). Similarly, the UE 115-a may transmit uplink transmissions 240 to the base station 105-a via a second beam 215-b (e.g., uplink beam 215-b), and the base station 105-a may receive uplink transmissions 240 via a second beam 210-b (e.g., uplink beam 210-b).

In some aspects, the base station 105-a, the UE 115-a, or both, may perform directional beamforming for performing uplink transmission 240 and downlink transmissions 235. In some cases, beams used for downlink transmissions 235 (e.g., first beam 210-a, first beam 215-a) and uplink transmissions 240 (e.g., second bream 210-b, second beam 215-b) may be configured according to different parameters. For example, beams for downlink transmissions 235 (e.g., first beam 210-a, first beam 215-a) may be configured based on TCI states, whereas beams for uplink transmissions 240 (e.g., second beam 210-b, second beam 215-b) may be configured based on spatial relationship information (e.g., spatial filters). In this regard, the first beam 210-a and/or first beam 215-a used for downlink transmissions 235 and the second beam 210-b and/or second beam 215-b used for uplink transmissions 240, respectively, may be configured via separate signaling between the base station 105-a and the UE 115-a. This separate signaling used to separately configure the downlink beams (e.g., first beams 210-a, 215-a) and the uplink beams (e.g., second beams 210-b, 15-b) may result in increased network overhead and inefficient use of resources within the wireless communications system 200.

Accordingly, the wireless communications system 200 may be configured to support signaling between the base station 105-a and the UE 115-a which provides for improved uplink and downlink beam configuration. Specifically, the wireless communications system 200 may support signaling for common uplink and downlink beam configuration. In particular, techniques described herein may be used to selectively configure and/or adjust beams 210, 215 for multiple transmissions (e.g., downlink transmissions 235, uplink transmissions 240) via a single DCI message 230.

By enabling for multiple beams (e.g., first beam 215-a, second beam 215-b) at the UE 115-a to be signaled and configured via a single DCI message 230, the techniques described herein may reduce the signaling required to configure the respective beams 215 as compared to wireless communications systems which configure the beams 215 separately. In this regard, techniques described herein may thereby reduce control signaling overhead and improve resource utilization in the wireless communications system 200. Moreover, due to the fact downlink beams (e.g., first beam 215-a) and uplink beams (e.g., second beam 215-b) (e.g., beam pair links) are generally updated in tandem as the relative positioning of the UE 115-a changes with respect to the base station 105-a, techniques described herein may improve the speed and efficiency with which beams 215 may be updated, thereby improving the efficiency of wireless communications within the wireless communications system 200.

For example, as shown in FIG. 2, the UE 115-a may transmit a capability report 220 to the base station 105-a. In some aspects, the capability report 220 may indicate whether the UE 115-a is capable of selectively configuring (e.g., selectively adjusting or modifying) beams 215 associated with transmissions (e.g., downlink transmissions 235, uplink transmissions 240) based on DCI messages 230 other than the DCI message 230 which scheduled the respective transmission. For example, the capability report 220 may indicate a capability of the UE 115-a to selectively adjust the second beam 215-b associated with a second transmission (e.g., uplink transmission 240-a) which was scheduled by a second message 230-b based on information associated with the second beam 215-b which is included within a first DCI message 230-a. In some cases, the second message 230-b may be a second DCI message. In some cases, the second message 230-b may be a message using RRC signaling or a MAC control element (MAC-CE) message (e.g., signaling for configured grant implementations). In this regard, the capability report 220 may include an indication as to whether or not the UE 115-*a* supports cross-DCI beam adjustment for common or paired beams 215.

In some aspects, the base station 105-*a* may transmit a control message 225 to the UE 115-*a*. In some cases, the control message 225 may include an RRC message. In some aspects, the control message 225 may include an indication of a configuration for selectively adjusting beams 215 associated with transmissions via DCI messages 230 which did not schedule the transmissions. In this regard, the control message 225 may include an indication as to whether or not the wireless communications system 200 supports cross-DCI beam adjustment for common or paired beams 215. In some aspects, the base station 105-*a* may transmit the control message 225 based on receiving the capability report 220. Conversely, in other cases, the UE 115-*a* may transmit the capability report 220 based on (e.g., in response to) receiving the control message 225.

In additional or alternative aspects, the control message 225 may include an indication of a relationship between related (e.g., paired) beams 215, a relationship between related transmissions, or both. In some aspects, the relationship may indicate beams 215 which are to be configured (e.g., adjusted, modified) in conjunction with one another. For example, the control message 225 may include an indication of a relationship between a first transmission (e.g., downlink transmission 235) and a second transmission (e.g., uplink transmission 240-*a*) between the UE 115-*a* and the base station 105-*a*. In this example, the UE 115-*a* and/or the base station 105-*a* may be configured to determine that the first beam 215-*a* associated with the first transmission (e.g., downlink transmission 235) and the second beam 215-*b* associated with the second transmission (e.g., uplink transmission 240-*a*) are to be configured (e.g., adjusted, modified) in conjunction with one another (e.g., in tandem). Accordingly, upon identifying that a beam 215 is to be configured or adjusted, the UE 115-*a* and/or the base station 105-*a* may be configured to utilize the relationship information indicated in the control message 225 to identify other beams 215 which are to be configured or adjusted in tandem with the indicated beam 215.

For instance, the control message 225 may indicate that beams 215 associated with transmissions which are scheduled in a common component carrier, common set of component carriers (e.g., common component carrier group), common BWP, and/or common set of BWPs (e.g., common BWP group) are to be adjusted in tandem. By way of another example, the control message 225 may indicate a relationship between a first transmission and a HARQ response (e.g., second transmission) for the first transmission, such that a first beam 215 associated with the first transmission and a second beam 215 associated with the HARQ response (e.g., second transmission) associated with the first transmission are to be configured in conjunction with one another.

In some aspects, the base station 105-*a* may transmit a second message 230-*b* to the UE 115-*a*. In some aspects, the second message 230-*b* may schedule a second transmission (e.g., uplink transmission, downlink transmission) between the UE 115-*a* and the base station 105-*a*. For example, the second message 230-*b* may schedule an uplink transmission 240-*a* from the UE 115-*a* to the base station 105-*a*. In some aspects, the second message 230-*b* may include an indication of the second beam 215-*b* associated with the second transmission (e.g., second beam 215-*a* which is to be used by the UE 115-*a* to perform the uplink transmission 240-*a*). The indication of the second beam 215-*b* may include any characteristics associated with the beam 215-*b* known in the art including, but not limited to, a transmission power, a beam orientation, a TCI state, a spatial filtering metric, beamforming or precoding characteristics, and the like. In some aspects, the base station 105-*a* may transmit the second message 230-*b* based on receiving the capability report 220, transmitting the control message 225, or both.

In some aspects, the base station 105-*a* may transmit a first DCI message 230-*a* to the UE 115-*a*. In some aspects, the base station 105-*a* may transmit the first DCI message 230-*a* based on receiving the capability report 220, transmitting the control message 225, transmitting the second message 230-*b*, or any combination thereof. In some aspects, the first DCI message 230-*a* may schedule a first transmission (e.g., uplink transmission, downlink transmission) between the UE 115-*a* and the base station 105-*a*. For example, the first DCI message 230-*a* may schedule a downlink transmission 235 from the base station 105-*a* to the UE 115-*a*. The first DCI message 230-*a* may include any format including, but not limited to, DCI format 1_1, DCI format 1_2, and the like.

While the first DCI message 230-*a* and the second message 230-*b* are generally shown and described as scheduling the downlink transmission 235 and the uplink transmission 2340, respectively, this is not to be regarded as a limitation of the present disclosure. In this regard, in some cases, the first DCI message 230-*a* may instead schedule the downlink transmission 235, and the second message 230-*b* may instead schedule the uplink transmission 240-*a*.

In some aspects, the first DCI message 230-*a* may include an indication of the first beam 215-*a* associated with the first transmission (e.g., first beam 215-*a* which is to be used by the UE 115-*a* to receive the downlink transmission 235). Additionally, the first DCI message 230-*a* may include an indication of the second beam 215-*b* associated with the second transmission (e.g., uplink transmission 240-*a*) scheduled by the second message 230-*b*. In some aspects, the first DCI message 230-*a* may include an indication that the first beam 215-*a* is associated with the second beam 215-*b*. In some aspects, the indication of the second beam 215-*b* associated with the first beam 215-*a* may include one or more bit field values within the first DCI message 230-*a*. For example, the first DCI message 230-*a* may include one or more TCI state fields which may be used to indicate one or more beams 215 (e.g., the second beam 215-*b*) which are associated with the first beam 215-*a* indicated by the first DCI message 230-*a*. In this regard, TCI state fields within the first DCI message 230-*a* may be used to indicate common or paired beams 215 which are to be configured in tandem. As noted previously herein, the indication of the first beam 215-*a* d second beam 215-*b* indicated in the first DCI message 230-*a* may include any characteristics associated with the respective beams 215 known in the art including, but not limited to, a transmission power, a beam orientation, a TCI state, a spatial filtering metric, beamforming or precoding characteristics, and the like.

In some aspects, the first beam 215-*a* and the second beam 215-*b* indicated via the first DCI message 230-*a* may be associated with a common TCI state. For example, in some cases, the first beam 215-*a* and the second beam 215-*b* may be the same. In such cases, the beam 215 may be configured to perform both uplink transmissions 240 and downlink transmissions 235. In additional or alternative cases, the first beam 215-*a* and the second beam 215-*b* may include separate beams 215 which are related or paired with one another such that the beams 215 are to be configured (e.g., adjusted, modified) in conjunction with one another. For example, in some cases, the first beam 215-*a* may be associated with a first TCI state, and the second beam 215-*b* may be associated with a second TCI state which is different from the first TCI state (e.g., TCI codepoint, or pair of related TCI states).

In additional or alternative aspects, the first DCI message 230-*a* may include an indication of a configuration for selectively adjusting beams 215 associated with transmissions via DCI messages 230 which did not schedule the transmissions. Thus, the first DCI message 230-*a* may dynamically indicate whether or not the wireless communications system 200 supports cross-DCI beam adjustment for common or paired beams 215. In this regard, the base station 105-*a* may indicate, to the UE 115-*a*, a configuration for selectively adjusting beams 215 associated with transmissions via DCI messages 230 which did not schedule the transmissions via the control message 225 (e.g., RRC message), via the first DCI message 230-*a*, or both.

In some aspects, the first DCI message 230-*a* may include an indication of the second transmission (e.g., uplink transmission 240-*a*) associated with the second beam 215-*b*. In this regard, the first DCI message 230-*a* may explicitly indicate one or more transmissions, one or more beams 215, or both, which are to be selectively configured (e.g., selectively adjusted, modified) in conjunction with the first beam 215-*a* associated with the first transmission (e.g., downlink transmission 235) scheduled by the first DCI message 230-*a*. For example, in cases where the first beam 215-*a* associated with the downlink transmission 235 scheduled by the first DCI message 230-*a* is to be configured (e.g., adjusted, modified) in tandem with the second beam 215-*b* associated with the uplink transmission 240-*a* scheduled by the second message 230-*b*, the first DCI message 230-*a* may include an explicit indication of the uplink transmission 240-*a* and/or second beam 215-*a* associated with the uplink transmission 240-*a*. In some aspects, the indication of the second transmission (e.g., uplink transmission 240-*b*) may include a resource identifier (e.g., SRS resource ID) associated with the second transmission.

In some aspects, the UE 115-*a*, the base station 105-*a*, or both, may identify one or more beams 215 and/or one or more transmissions which are associated with the first beam 215-*a* and/or first transmission (e.g., downlink transmission 235) indicated by the first DCI message 230-*a*. For example, the UE 115-*a* may identify that the uplink transmission 240-*a* scheduled by the second message 230-*b* is associated with the downlink transmission 235 scheduled by the first DCI message 230-*a*. The downlink transmission 235 scheduled by the first DCI message 230-*a*, the uplink transmission 240-*a* scheduled by the second message 230-*b*, or both, may include any transmission between the UE 115-*a* and the base station 105-*a* known in the art including, but not limited to, physical uplink shared channel (PUSCH) transmissions, physical uplink control channel (PUCCH) transmissions, sounding reference signals (SRSs), physical downlink shared channel (PDSCH) transmissions, CSI-RSs, or any combination thereof.

In some aspects, the UE 115-*a*, the base station 105-*a*, or both, may identify the one or more beams 215 and/or transmissions which are associated with the first beam 215-*a* and/or first transmission (e.g., downlink transmission 235) based on the control message 225, the second message 230-*b*, the first DCI message 230-*a*, or any combination thereof. For example, in cases where the first DCI message 230-*a* includes an explicit indication of the uplink transmission 240-*a* associated with the second beam 215-*b*, the UE 115-*a* may be configured to identify that the uplink transmission 240-*a* is associated with the downlink transmission 235 based on the indication. In this example, by identifying that the uplink transmission 240-*a* is associated with the downlink transmission 235, the UE 115-*a* may be configured to identify that the second beam 215-*b* associated with the uplink transmission 240-*a* and the first beam 215-*a* associated with the downlink transmission 235 are to be configured (e.g., adjusted, modified) in tandem.

In additional or alternative cases, the UE 115-*a* and/or the base station 105-*a* may be configured to identify the beams 215 and/or transmissions which are associated with the first beam 215-*a* and/or first transmission (e.g., downlink transmission 235) indicated in the first DCI message 230-*a* based on relationships between the first beam 215-*a* and/or first transmission and other beams/transmissions indicated in the control message 225. For example, as noted previously herein, the control message 225 may indicate a relationship between the first transmission (e.g., downlink transmission 235) and other transmissions (e.g., uplink transmission 240-*a*) which are to be configured (e.g., adjusted, modified) in tandem with the first beam 215-*a* associated with the first transmission (e.g., downlink transmission). In this example, the UE 115-*a* may be configured to identify that the second transmission is associated with the first transmission (e.g., the second beam 215-*b* is to be configured in tandem with the first beam 215-*a*) based on the indicated relationship.

For instance, the control message 225 may indicate that beams 215 associated with any transmissions (e.g., downlink transmissions 235, uplink transmissions 240) scheduled within the same BWP as the first transmission (e.g., downlink transmission 235) are to be configured in tandem with the first beam 215-*a*. In this example, the UE 115-*a* may be configured to determine that the uplink transmission 240-*a* is scheduled in the same BWP as the downlink transmission 235, and may thereby determine that the uplink transmission 240-*a* is associated with the downlink transmission 235 (e.g., the second beam 215-*b* is to be configured in tandem with the first beam 215-*a*). By way of another example, the control message 225 may indicate that beams 215 associated with transmissions and beams associated with HARQ responses to those transmissions are to be configured in tandem. In this example, the UE 115-*a* may be configured to determine that the uplink transmission 240-*a* includes a HARQ response for the downlink transmission 235, and may thereby determine that the uplink transmission 240-*a* is associated with the downlink transmission 235 (e.g., the second beam 215-*b* is to be configured in tandem with the first beam 215-*a*).

In some aspects, the UE 115-*a*, the base station 105-*a*, or both, may be configured to configure (e.g., adjust, modify) the first beam 215-*a* associated with the first transmission (e.g., downlink transmission 235), the second beam 215-*b* associated with the second transmission (e.g., uplink transmission 240-*a*), or both. In this regard, the UE 115-*a* and/or the base station 105-*a* may be configured to identify one or more parameters or characteristics which may be used to configure the first beam 215-*a* and/or the second beam 215-*b*. The UE 115-*a* and or the base station 105-*a* may be configured to configure the first beam 215-*a* and/or the second beam 215-*b* based on transmitting/receiving the capability report 220, transmitting/receiving the control message 225, transmitting/receiving the second message 230-*b*, transmitting/receiving the first DCI message 230-*a*, identifying the beams 215 and/or transmissions associated with the first beam 215-*a* and/or first transmission, or any combination thereof.

Parameters associated with the respective beams 215 which may be determined and configured (e.g., adjusted, modified) may include, but are not limited to, spatial filtering parameters, TCI states, beam orientations, transmission powers, beamforming parameters, precoding parameters, or any combination thereof. For example, the UE 115-*a* may be configured to determine a spatial filter associated with the first beam 215-*a*, the second beam 215-*b*, or both. For instance, the UE 115-*a* may determine a spatial filter associated with the first beam 215-*a* based on receiving the first DCI message 230-*a*. In some aspects, upon identifying the spatial filter associated with the first beam 215-*a*, the UE 115-*a* may configure (e.g., adjust, modify), a spatial filter associated with the first beam 215-*a* and/or the second beam 215-*b* based on the determined spatial filter. In particular, in cases where the UE 115-*a* is configured with beam correspondence, the UE 115-*a* may apply the same spatial filter to the first beam 215-*a* and the second beam 215-*b* for performing both uplink and downlink transmissions. Conversely, in cases where the UE 115-*a* is not configured with beam correspondence, the UE 115-*a* may be configured to pair the first beam 215-*a* and the second beam 215-*b* for performing uplink and downlink transmissions due to the fact that the first beam 215-*a* and the second beam 215-*b* are mapped to a common beam at the base station 105-*a*.

By way of another example, the UE 115-*a* may be configured to determine an orientation associated with the first beam 215-*a* based on an indication in the first DCI message 230-*a*. In this example, the UE 115-*a* may configure (e.g., adjust, modify) an orientation of the first beam 215-*a* and/or the second beam 215-*b* based on the determined orientation.

In some aspects, the UE 115-*a* and the base station 105-*a* may communicate with one another via the first beam 215-*a*. In this regard, the UE 115-*a* and the base station 105-*a* may perform (e.g., transmit, receive) the first transmission via the first beam 215-*a*. For example, in cases where the first transmission scheduled by the first DCI message 230-*a* includes the downlink transmission 235, the UE 115-*a* may receive the downlink transmission 235 from the base station 105-*a* via the first beam 215-*a* associated with the downlink transmission 235. In some aspects, the UE 115-*a* and/or the base station 105-*a* may communicate with one another via the first beam 215-*a* based on transmitting/receiving the capability report 220, transmitting/receiving the control message 225, transmitting/receiving the second message 230-*b*, transmitting/receiving the first DCI message 230-*a*, identifying the beams/transmissions associated with the first beam 215-*a* and/or first transmission, configuring the first beam 215-*a*, or any combination thereof.

Similarly, the UE 115-*a* and the base station 105-*a* may communicate with one another via the second beam 215-*b*. In this regard, the UE 115-*a* and the base station 105-*a* may perform (e.g., transmit, receive) the second transmission via the second beam 215-*b*. For example, in cases where the second transmission 215-*b* scheduled by the second message 230-*b* includes the uplink transmission 240-*a*, the UE 115-*a* may transmit the uplink transmission 240-*a* to the base station 105-*a* via the second beam 215-*b* associated with the uplink transmission 240-*a*.

In some aspects, the UE 115-*a* and the base station 105-*a* may communicate with one another via the second beam 215-*b* based on the first DCI message 230-*a* including the indication of the second beam 215-*b* associated with the first beam 215-*a*. Additionally or alternatively, the UE 115-*a* and/or the base station 105-*a* may communicate with one another via the first beam 215-*a* based on transmitting/ receiving the capability report 220, transmitting/receiving the control message 225, transmitting/receiving the second message 230-*b*, transmitting/receiving the first DCI message 230-*a*, identifying the beams/transmissions associated with the first beam 215-*a* and/or first transmission, configuring the second beam 215-*b*, or any combination thereof. For example, the UE 115-*a* and the base station 105-*a* may communicate via the second beam 215-*b* based on an indication of the second transmission (e.g., uplink transmission 240-*a*) within the first DCI message 230-*a*.

As noted previously herein, the first transmission (e.g., downlink transmission 235) and the second transmission (e.g., uplink transmission 240-*a*) may include any transmissions known in the art including, but not limited to, PUSCH transmissions, PUCCH transmissions, SRSs, PDSCHs, CSI-RSs, or any combination thereof. In some aspects, the first transmission and the second transmission may be scheduled and performed in a common component carrier, a common set of component carriers, a common BWP, a common set of BWPs, or any combination thereof. In some aspects, the first transmission and the second transmission may include the same type of transmission (e.g., downlink transmission, uplink transmission) and/or different types of transmissions. For example, in some cases, the first transmission scheduled by the first DCI message 230-*a* may include a downlink transmission 235, and the second transmission scheduled by the second message 230-*b* may include an uplink transmission. Conversely, by way of another example, the first transmission scheduled by the first DCI message 230-*a* may include an uplink transmission 240, and the second transmission scheduled by the second message 230-*b* may include a downlink transmission 235. For instance, in some aspects, the second transmission may include a HARQ response (e.g., ACK, NACK) associated with the first transmission.

In some aspects, the UE 115-*a* and/or the base station 105-*a* may configure subsequent beams 215 and/or perform subsequent transmissions with one or more parameters associated with the first beam 215-*a* and/or the second beam 215-*b*. For example, the base station 105-*a* may transmit a third DCI message 230-*c* to the UE 115-*a*. In some aspects, the third DCI message 230-*c* may schedule a third transmission between the UE 115-*a* and the base station 105-*a*. For example, in some cases, the third DCI message 230-*c* may schedule an uplink transmission 240-*b* from the UE 115-*a* to the base station 105-*a*.

In some aspects, the UE 115-*a*, the base station 105-*a*, or both, may be configured to determine a set of resources associated with the third transmission (e.g., uplink transmission 240-*b*). For example, the UE 115-*a* and/or the base station 105-*a* may be configured to determine a set of time resources, a set of frequency resources, or both, associated with the third transmission. For instance, the UE 115-*a* and/or the base station 105-*a* may be configured to determine a component carrier(s) associated with the third transmission, a BWP(s) associated with the third transmission, or both.

In some aspects, the UE 115-*a* and/or the base station 105-*a* may be configured to determine whether the third transmission (e.g., uplink transmission 240-*b*) is scheduled in a common set of resources as the first transmission (e.g., downlink transmission 235), the second transmission (e.g., uplink transmission 240-*a*), or both. For example, the UE 115-*a* and/or the base station 105-*a* may be configured to determine whether the third transmission (e.g., uplink transmission 240-*b*) is scheduled in a common component carrier, a common set of component carriers, a common BWP, a common set of BWPs, or any combination thereof, with respect to the resources associated with the first transmission and/or the second transmission. Additionally or alternatively, the UE 115-*a* and/or the base station may be configured to determine whether the third DCI message 230-*c* includes a TCI state associated with the third transmission.

The UE 115-*a* and the base station 105-*a* may communicate with one another via the third transmission based on the first beam 215-*a*, the second beam 215-*b*, or both. In this regard, the UE 115-*a* and/or the base station 105-*a* may be configured to perform (e.g., transmit, receive) the third transmission using the first beam 215-*a* associated with the first transmission, via the second beam 215-*b* associated with the second transmission, or both. In this regard, the UE 115-*a* and the base station 105-*a* may be configured to perform the third transmission using the first beam 215-*a* and/or the second beam 215-*b* based on receiving the second message 230-*b*, the first DCI message 230-*a*, the third DCI message 230-*c*, or any combination thereof. For example, as shown in FIG. 2, the UE 115-*a* may transmit the uplink transmission 240-*b* via the second beam 215-*b*.

In some aspects, the UE 115-*a* and/or the base station 105-*a* may be configured to communicate via the third transmission (e.g., uplink transmission 2340-*b*) using the first beam 215-*a* and/or the second beam 215-*b* based on determining that the third transmission and one or more of the first transmission (e.g., downlink transmission 235) or the second transmission (e.g., uplink transmission 240-*a*) are scheduled in the common component carrier, the common set of component carriers, the common BWP, the common set of BWPs, or any combination thereof.

In additional or alternative aspects, the UE 115-*a* and/or the base station 105-*a* may be configured to communicate via the third transmission using the first beam 215-*a* and/or the second beam 215-*b* based on determining that the third DCI message 230-*c* does not include a TCI state associated with the third transmission. Accordingly, the UE 115-*a* may be configured to re-use the configuration of the first beam 215-*a* and/or the second beam 215-*b* to perform the third transmission based on identifying that the third DCI message 230-*c* did not include a TCI state or other information associated with a beam to be used to perform the third transmission. In some aspects, the UE 115-*b* may be configured to re-use a configuration of a beam 215 which was used to transmit a previously-performed transmission of a same type (e.g., downlink transmission 235, uplink transmission 240), which is in the same component carrier, component carrier group, BWP, and/or BWP group, or any combination thereof.

For example, in some cases, the third DCI message 230-*c* may schedule an additional downlink message 235 (not shown) from the base station 105-*a* to the UE 115-*a*, and the UE 115-*a* may identify that the third DCI message 230-*c* does not include a TCI state for the additional downlink message 235. In this example, the UE 115-*c* may further identify that the additional downlink message 235 is scheduled in the same component carrier as the previously-received downlink transmission 235 illustrated in FIG. 2. In this regard, the UE 115-*a* may be configured to re-use the configuration of the first beam 215-*a* to receive the additional downlink message 235. Furthermore, in some cases, the UE 115-*a* may be configured to re-use a configuration of the first beam 215-*a* which was indicated via a DCI message 230 (e.g., second message 230-*b*) which scheduled an uplink transmission 240 and further indicated a configuration for a beam 215 used for downlink transmissions.

The techniques described herein may provide signaling which enables multiple beams (e.g., first beam 215-*a*, second beam 215-*b*) to be configured and/or adjusted via a single control message (e.g., DCI message 230). In particular, according to aspects described herein, a single DCI message 230 may be configured to adjust and/or configure a first beam 215-*a* associated with a transmission scheduled by the DCI message 230, as well as one or more additional beams (e.g., second beam 215-*b*) associated with the first beam 215-*a*. In this regard, techniques described herein may enable a single DCI message 230 to configure and/or adjust beams 215 associated with transmissions which are scheduled by different DCI messages 230. By providing for multiple beams 215-*a*, 215-*b* to be configured according to a single control message (e.g., DCI message 230), techniques described herein may reduce control signaling overhead and improve resource utilization in the wireless communications system 200.

Figure 3:
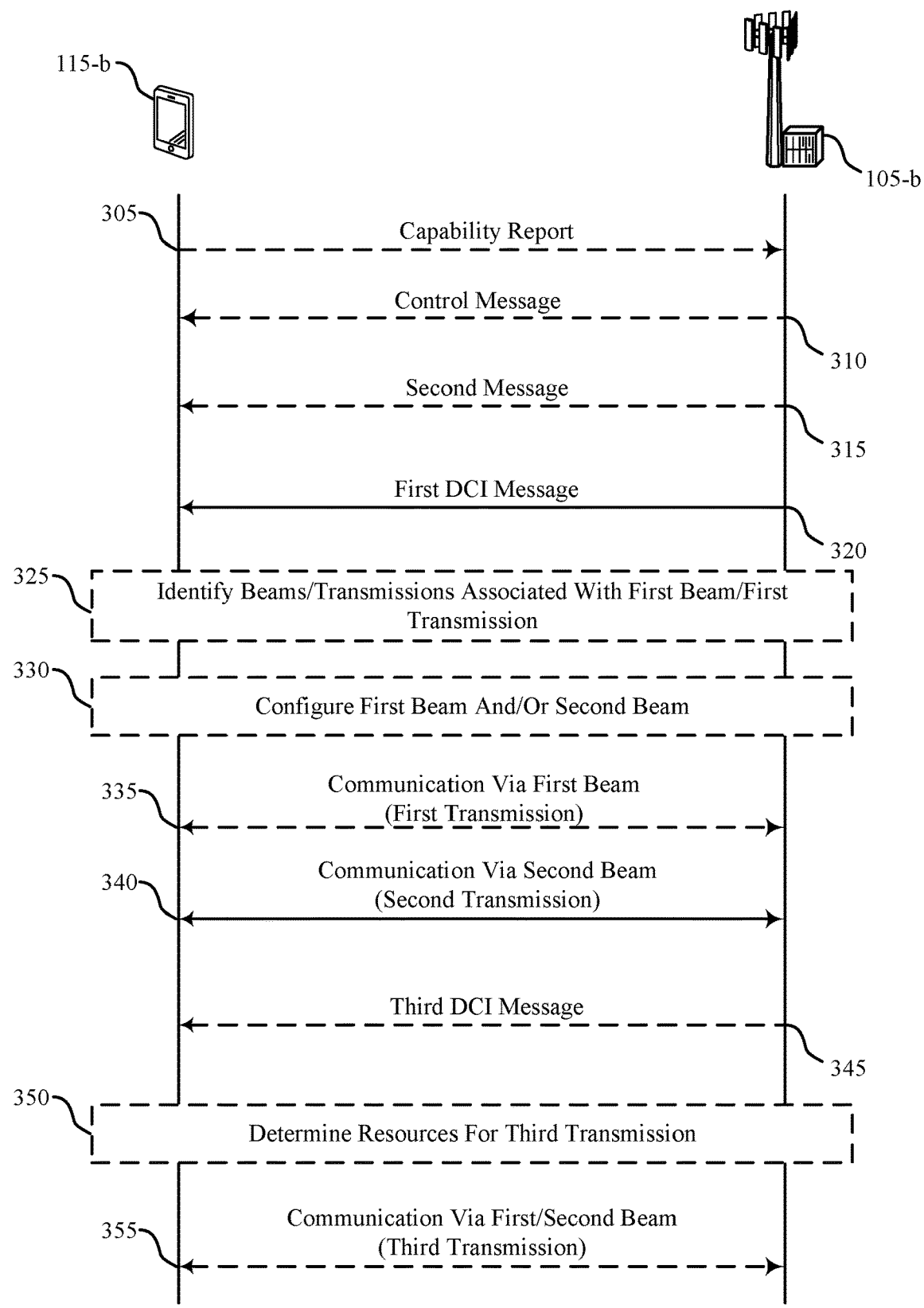
FIG. 3 illustrates an example of a process flow that supports techniques for signaling a common downlink and uplink beam in accordance with aspects of the present disclosure.

FIG. 3 illustrates an example of a process flow 300 that supports techniques for signaling a common downlink and uplink beam in accordance with aspects of the present disclosure. In some examples, process flow 300 may implement, or be implemented by, aspects of wireless communications system 100, wireless communications system 200, or both. For example, the process flow 300 may illustrate a UE 115-*b* receiving a first DCI message scheduling a first transmission, identifying a first beam associated with the first transmission, identifying a second beam associated with the first beam and a second transmission scheduled by a different DCI message, and communicating with the base station 105-*b* via the first beam and the second beam, as described with reference to FIGS. 1-2, among other aspects. In some aspects, the process flow 300 may include a UE 115-*b* and a base station 105-*b*, which may include examples of UEs 115 and base stations 105 as described with reference to FIGS. 1-2.

In some examples, the operations illustrated in process flow 300 may be performed by hardware (e.g., including circuitry, processing blocks, logic components, and other components), code (e.g., software or firmware) executed by a processor, or any combination thereof. Alternative examples of the following may be implemented, where some steps are performed in a different order than described or are not performed at all. In some cases, steps may include additional features not mentioned below, or further steps may be added.

At 305, the UE 115-*b* may transmit a capability report to the base station 105-*b*. In some aspects, the capability report may indicate whether the UE 115-*b* is capable of selectively configuring (e.g., selectively adjusting or modifying) beams associated with transmissions based on DCI messages other than the DCI message which scheduled the respective transmission. For example, as described herein, the capability report may indicate a capability of the UE 115-*b* to selectively adjust a second beam associated with a second transmission which was scheduled by a second message based on information associated with the second beam which is included within a first DCI message. In some cases, the second message may be a second DCI message. In some cases, the second message may be a message using RRC signaling or a MAC-CE message. In this regard, the capability report may include an indication as to whether or not the UE 115-*b* supports cross-DCI beam adjustment for common or paired beams.

At 310, the base station 105-*b* may transmit a control message to the UE 115-*b*. In some cases, the control message may include an RRC message. In some aspects, the control message may include an indication of a configuration for selectively adjusting beams associated with transmissions via DCI messages which did not schedule the transmissions. In this regard, the control message may include an indication as to whether or not the wireless communications system supports cross-DCI beam adjustment for common or paired beams. In some aspects, the base station 105-*b* may transmit the control message based on receiving the capability report at 305. Conversely, in other cases, the UE 115-*b* may transmit the capability report at 305 based on (e.g., in response to) receiving the control message at 310.

In additional or alternative aspects, the control message may include an indication of a relationship between related (e.g., paired) beams, a relationship between related transmissions, or both. In some aspects, the relationship may indicate beams which are to be configured (e.g., adjusted, modified) in conjunction with one another. For example, the control message may include an indication of a relationship between a first transmission and a second transmission between the UE 115-*b* and the base station 105-*b*. In this example, the UE 115-*b* and/or the base station 105-*b* may be configured to determine that a first beam associated with the first transmission and a second beam associated with the second transmission are to be configured (e.g., adjusted, modified) in conjunction with one another (e.g., in tandem). Accordingly, upon identifying that a beam is to be configured or adjusted, the UE 115-*b* and/or the base station 105-*b* may be configured to utilize the relationship information indicated in the control message to identify other beams which are to be configured or adjusted in tandem with the indicated beam.

For instance, the control message may indicate that beams associated with transmissions which are scheduled in a common component carrier, common set of component carriers (e.g., common component carrier group), common BWP, and/or common set of BWPs (e.g., common BWP group) are to be adjusted in tandem. By way of another example, the control message may indicate a relationship between a first transmission and a HARQ response (e.g., second transmission) for the first transmission, such that a first beam associated with the first transmission and a second beam associated with the HARQ response (e.g., second transmission) associated with the first transmission are to be configured in conjunction with one another.

At 315, the base station 105-*b* may transmit a second message to the UE 115-*b*. In some aspects, the second message may schedule a second transmission (e.g., uplink transmission, downlink transmission) between the UE 115-*b* and the base station 105-*b*. For example, the second message may schedule an uplink transmission from the UE 115-*b* to the base station 105-*b*. In some aspects, the second message may be a second DCI message. In some aspects, the second message may be a may be a message using RRC signaling or a MAC-CE message. In some aspects, the second message may include an indication of a second beam associated with the second transmission (e.g., second beam which is to be used by the UE 115-*b* to perform the second transmission). The indication of the second beam may include any characteristics associated with the beam known in the art including, but not limited to, a transmission power, a beam orientation, a TCI state, a spatial filtering metric, beamforming or precoding characteristics, and the like. In some aspects, the base station 105-*b* may transmit the second message based on receiving the capability report at 305, transmitting the control message at 310, or both.

At 320, the base station 105-*b* may transmit a first DCI message to the UE 115-*b*. In some aspects, the base station 105-*b* may transmit the first DCI message based on receiving the capability report at 305, transmitting the control message at 310, transmitting the second message, or any combination thereof. In some aspects, the first DCI message may schedule a first transmission (e.g., uplink transmission, downlink transmission) between the UE 115-*b* and the base station 105-*b*. For example, the first DCI message may schedule a downlink transmission from the base station 105-*b* to the UE 115-*b*. The first DCI message may include any format including, but not limited to, DCI format 1_1, DCI format 1_2, and the like.

In some aspects, the first DCI message may include an indication of a first beam associated with the first transmission (e.g., first beam which is to be used by the UE 115-*b* to perform the first transmission). Additionally, the first DCI message may include an indication of a second beam associated with the second transmission scheduled by the second message received at 315. In some aspects, the first DCI message may include an indication that the first beam is associated with the second beam. In some aspects, the indication of the second beam associated with the first beam may include one or more bit field values within the first DCI message. For example, the first DCI message may include one or more TCI state fields which may be used to indicate one or more beams (e.g., the second beam) which are associated with the first beam indicated by the first DCI message. In this regard, TCI state fields within the first DCI message may be used to indicate common or paired beams which are to be configured in tandem. As noted previously herein, the indication of the first beam and/or second beam indicated in the first DCI message may include any characteristics associated with the respective beams known in the art including, but not limited to, a transmission power, a beam orientation, a TCI state, a spatial filtering metric, beamforming or precoding characteristics, and the like.

In some aspects, the first beam and the second beam indicated via the first DCI message may be associated with a common TCI state. For example, in some cases, the first beam and the second beam may be the same. In such cases, the beam may be configured to perform both uplink and downlink transmissions. In additional or alternative cases, the first beam and the second beam may include separate beams which are related or paired with one another such that the beams are to be configured (e.g., adjusted, modified) in conjunction with one another. For example, in some cases, the first beam may be associated with a first TCI state, and the second beam may be associated with a second TCI state which is different from the first TCI state.

In additional or alternative aspects, the first DCI message may include an indication of a configuration for selectively adjusting beams associated with transmissions via DCI messages which did not schedule the transmissions. Thus, the first DCI message may dynamically indicate whether or not the wireless communications system supports cross-DCI beam adjustment for common or paired beams. In this regard, the base station 105-*b* may indicate, to the UE 115-*b*, a configuration for selectively adjusting beams associated with transmissions via DCI messages which did not schedule the transmissions via the control message (e.g., RRC message) at 310, via the first DCI message at 320, or both.

In some aspects, the first DCI message may include an indication of the second transmission associated with the second beam. In this regard, the first DCI message may explicitly indicate one or more transmissions, one or more beams, or both, which are to be selectively configured (e.g., selectively adjusted, modified) in conjunction with the first beam associated with the first transmission scheduled by the first DCI message. For example, in cases where the first beam associated with the first transmission scheduled by the first DCI message is to be configured (e.g., adjusted, modified) in tandem with the second beam associated with the second transmission scheduled by the second message, the first DCI message may include an explicit indication of the second transmission and/or second beam associated with the second transmission. In some aspects, the indication of the second transmission may include a resource identifier (e.g., SRS resource ID) associated with the second transmission.

At 325, the UE 115-b, the base station 105-b, or both, may identify one or more beams and/or one or more transmissions which are associated with the first beam and/or first transmission indicated by the first DCI message. For example, at 325, the UE 115-b may identify that the second transmission scheduled by the second message at 315 is associated with the first transmission scheduled by the first DCI message at 320. The first transmission scheduled by the first DCI message, the second transmission scheduled by the second message, or both, may include any transmission between the UE 115-b and the base station 105-b known in the art including, but not limited to, PUSCH transmissions, PDSCH transmissions, SRSs, PDSCH transmissions, CSI-RSs, or any combination thereof.

In some aspects, the UE 115-b, the base station 105-b, or both, may identify the one or more beams and/or transmissions which are associated with the first beam and/or first transmission based on the control message at 310, the second message at 315, the first DCI message at 320, or any combination thereof. For example, in cases where the first DCI message includes an explicit indication of the second transmission associated with the second beam, the UE 115-b may be configured to identify that the second transmission is associated with the first transmission based on the indication. In this example, by identifying that the second transmission is associated with the first transmission, the UE 115-b may be configured to identify that the second beam associated with the second transmission and the first beam associated with the first transmission are to be configured (e.g., adjusted, modified) in tandem.

In additional or alternative cases, the UE 115-b and/or the base station 105-b may be configured to identify the beams and/or transmissions which are associated with the first beam and/or first transmission indicated in the first DCI message based on relationships between the first beam and/or first transmission and other beams/transmissions indicated in the control message at 310. For example, as noted previously herein, the control message at 310 may indicate a relationship between the first transmission and other transmissions which are to be configured (e.g., adjusted, modified) in tandem with the first beam associated with the first transmission. In this example, the UE 115-b may be configured to identify that the second transmission is associated with the first transmission (e.g., the second beam is to be configured in tandem with the first beam) based on the indicated relationship.

For instance, the control message at 310 may indicate that beams associated with any transmissions scheduled within the same BWP as the first transmission are to be configured in tandem with the first beam. In this example, the UE 115-b may be configured to determine that the second transmission is scheduled in the same BWP as the first transmission, and may thereby determine that the second transmission is associated with the first transmission (e.g., the second beam is to be configured in tandem with the first beam). By way of another example, the control message at 310 may indicate that beams associated with transmissions and beams associated with HARQ responses to those transmissions are to be configured in tandem. In this example, the UE 115-b may be configured to determine that the second transmission includes a HARQ response for the first transmission, and may thereby determine that the second transmission is associated with the first transmission (e.g., the second beam is to be configured in tandem with the first beam).

At 330, the UE 115-b, the base station 105-b, or both, may configure (e.g., adjust, modify) the first beam associated with the first transmission, the second beam associated with the second transmission, or both. In this regard, the UE 115-b and/or the base station 105-b may be configured to identify one or more parameters or characteristics which may be used to configure the first beam and/or the second beam. The UE 115-b and or the base station 105-b may configure the first beam and/or the second beam based on transmitting/receiving the capability report at 305, transmitting/receiving the control message at 310, transmitting/receiving the second message at 315, transmitting/receiving the first DCI message at 320, identifying the beams and/or transmissions associated with the first beam and/or first transmission at 325, or any combination thereof.

Parameters associated with the respective beams which may be determined and configured (e.g., adjusted, modified) at 330 may include, but are not limited to, spatial filtering parameters, TCI states, beam orientations, transmission powers, beamforming parameters, precoding parameters, or any combination thereof. For example, the UE 115-b may be configured to determine a spatial filter associated with the first beam, the second beam, or both. For instance, the UE 115-b may determine a spatial filter associated with the first beam based on receiving the first DCI message at 320. In some aspects, upon identifying the spatial filter associated with the first beam, the UE 115-b may configure (e.g., adjust, modify), a spatial filter associated with the first beam and/or the second beam based on the determined spatial filter. In particular, in cases where the UE 115-b is configured with beam correspondence, the UE 115-b may apply the same spatial filter to the first beam and the second beam for performing both uplink and downlink transmissions. Conversely, in cases where the UE 115-b is not configured with beam correspondence, the UE 115-b may be configured to pair the first beam and the second beam for performing uplink and downlink transmissions due to the fact that the first beam and the second beam are mapped to a common beam at the base station 105-b.

By way of another example, the UE 115-b may be configured to determine an orientation associated with the first beam based on an indication in the first DCI message. In this example, the UE 115-b may configure (e.g., adjust, modify) an orientation of the first beam and/or the second beam based on the determined orientation.

At 335, the UE 115-b and the base station 105-b may communicate with one another via the first beam. In this regard, the UE 115-b and the base station 105-b may perform (e.g., transmit, receive) the first transmission via the first beam. For example, in cases where the first transmission scheduled by the first DCI message at 320 includes a downlink transmission, the UE 115-b may receive the first transmission (e.g., downlink transmission) from the base station 105-b via the first beam associated with the first transmission. In some aspects, the UE 115-b and/or the base station 105-b may communicate with one another via the first beam at 335 based on transmitting/receiving the capability report at 305, transmitting/receiving the control message at 310, transmitting/receiving the second message at 315, transmitting/receiving the first DCI message at 320, identifying the beams/transmissions associated with the first beam and/or first transmission at 325, configuring the first beam at 330, or any combination thereof.

At 340, the UE 115-*b* and the base station 105-*b* may communicate with one another via the second beam. In this regard, the UE 115-*b* and the base station 105-*b* may perform (e.g., transmit, receive) the second transmission via the second beam. For example, in cases where the second transmission scheduled by the second message at 315 includes an uplink transmission, the UE 115-*b* may transmit the second transmission (e.g., uplink transmission) to the base station 105-*b* via the second beam associated with the second transmission.

In some aspects, the UE 115-*b* and the base station 105-*b* may communicate with one another via the second beam at 340 based on the first DCI message including the indication of the second beam associated with the first beam. Additionally or alternatively, the UE 115-*b* and/or the base station 105-*b* may communicate with one another via the first beam at 335 based on transmitting/receiving the capability report at 305, transmitting/receiving the control message at 310, transmitting/receiving the second message at 315, transmitting/receiving the first DCI message at 320, identifying the beams/transmissions associated with the first beam and/or first transmission at 325, configuring the second beam at 330, or any combination thereof. For example, the UE 115-*b* and the base station 105-*b* may communicate via the second beam at 340 based on an indication of the second transmission (e.g., resource identifier) within the first DCI message.

As noted previously herein, the first transmission and the second transmission may include any transmissions known in the art including, but not limited to, PUSCH transmissions, PUCCH transmissions, SRSs, PDSCHs, CSI-RSs, or any combination thereof. In some aspects, the first transmission and the second transmission may be scheduled and performed in a common component carrier, a common set of component carriers, a common BWP, a common set of BWPs, or any combination thereof. In some aspects, the first transmission and the second transmission may include the same type of transmission (e.g., downlink transmission, uplink transmission) and/or different types of transmissions. For example, in some cases, the first transmission scheduled by the first DCI message may include a downlink transmission, and the second transmission scheduled by the second message may include an uplink transmission. Conversely, by way of another example, the first transmission scheduled by the first DCI message may include an uplink transmission, and the second transmission scheduled by the second message may include a downlink transmission. For instance, in some aspects, the second transmission may include a HARQ response (e.g., ACK, NACK) associated with the first transmission.

In some aspects, the UE 115-*b* and/or the base station 105-*b* may configure subsequent beams and/or perform subsequent transmissions with one or more parameters associated with the first beam and/or the second beam determined at 330. For example, at 345, the base station 105-*b* may transmit a third DCI message to the UE 115-*b*. In some aspects, the third DCI message may schedule a third transmission between the UE 115-*b* and the base station 105-*b*. For example, in some cases, the third DCI message received at 345 may schedule an uplink transmission from the UE 115-*b* to the base station 105-*b*.

At 350, the UE 115-*b*, the base station 105-*b*, or both, may be configured to determine a set of resources associated with the third transmission. For example, the UE 115-*b* and/or the base station 105-*b* may be configured to determine a set of time resources, a set of frequency resources, or both, associated with the third transmission. For instance, the UE 115-*b* and/or the base station 105-*b* may be configured to determine a component carrier(s) associated with the third transmission, a BWP(s) associated with the third transmission, or both.

In some aspects, the UE 115-*b* and/or the base station 105-*b* may be configured to determine whether the third transmission is scheduled in a common set of resources as the first transmission at 335, the second transmission at 340, or both. For example, the UE 115-*b* and/or the base station 105-*b* may be configured to determine whether the third transmission is scheduled in a common component carrier, a common set of component carriers, a common BWP, a common set of BWPs, or any combination thereof, with respect to the resources associated with the first transmission and/or the second transmission.

Additionally or alternatively, at 350, the UE 115-*b* and/or the base station may be configured to determine whether the third DCI message transmitted/received at 345 includes a TCI state associated with the third transmission.

At 355, the UE 115-*b* and the base station 105-*b* may communicate with one another via the third transmission based on the first beam, the second beam, or both. In this regard, the UE 115-*b* and/or the base station 105-*b* may be configured to perform (e.g., transmit, receive) the third transmission at 355 using the first beam associated with the first transmission performed at 335, via the second beam associated with the second transmission performed at 340, or both. In this regard, the UE 115-*b* and the base station 105-*b* may be configured to perform the third transmission using the first beam and/or the second beam based on receiving the second message at 315, the first DCI message at 320, the third DCI message at 345, or any combination thereof.

In some aspects, the UE 115-*b* and/or the base station 105-*b* may be configured to communicate via the third transmission using the first beam and/or the second beam based on determining that the third transmission and one or more of the first transmission or the second transmission are scheduled in the common component carrier, the common set of component carriers, the common BWP, the common set of BWPs, or any combination thereof.

In additional or alternative aspects, the UE 115-*b* and/or the base station 105-*b* may be configured to communicate via the third transmission using the first beam and/or the second beam based on determining that the third DCI message at 345 does not include a TCI state associated with the third transmission. Accordingly, the UE 115-*b* may be configured to re-use the configuration of the first beam and/or the second beam to perform the third transmission based on identifying that the third DCI message did not include a TCI state or other information associated with a beam to be used to perform the third transmission.

The techniques described herein may provide signaling which enables multiple beams (e.g., downlink beams, uplink beams) to be configured and/or adjusted via a single control message (e.g., DCI message). In particular, according to aspects described herein, a single DCI message may be configured to adjust and/or configure a beam associated with a transmission scheduled by the DCI message, as well as one or more additional beams associated with the first beam. In this regard, techniques described herein may enable a single DCI message to configure and/or adjust beams associated with transmissions which are scheduled by different DCI messages. By providing for multiple beams to be configured according to a single control message (e.g., DCI message), techniques described herein may reduce control signaling overhead and improve resource utilization a wireless communications system.

Figure 4:
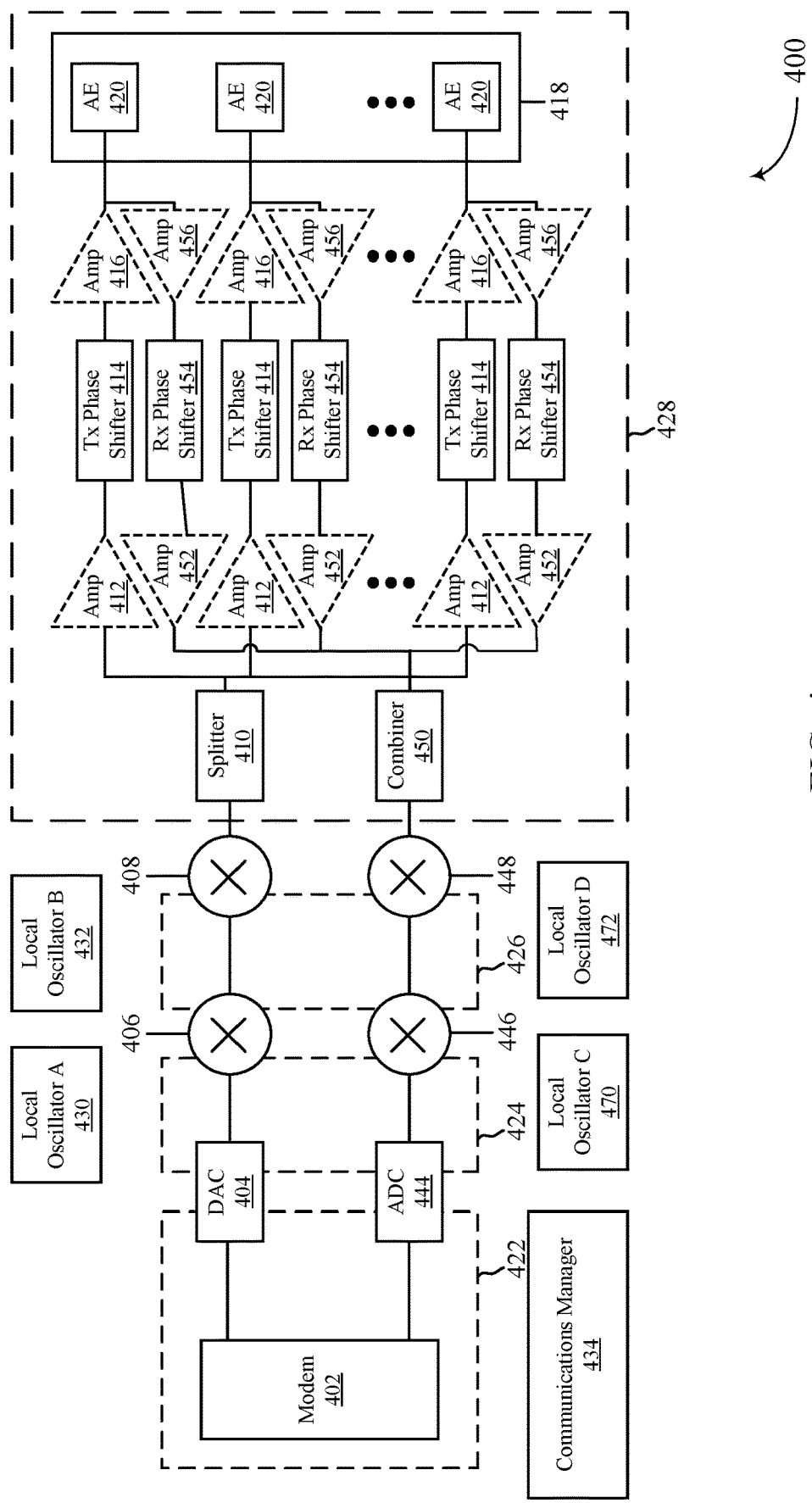
FIG. 4 illustrates an example of an architecture that supports techniques for signaling a common downlink and uplink beam in accordance with aspects of the present disclosure.

FIG. 4 illustrates an example of an architecture 400 that supports techniques for signaling a common downlink and uplink beam in accordance with aspects of the present disclosure. In some examples, architecture 400 may implement aspects of wireless communications system 100, wireless communications system 200, process flow 300, or any combination thereof. In some aspects, architecture 400 may be an example of a UE 115 and/or a receiving device as described herein.

Broadly, FIG. 4 is a diagram illustrating example hardware components of a wireless device in accordance with certain aspects of the disclosure. The illustrated components may include those that may be used for antenna element selection and/or for beamforming for transmission of wireless signals. There are numerous architectures for antenna element selection and implementing phase shifting, only one example of which is illustrated here. The architecture 400 includes a modem (modulator/demodulator) 402, a digital to analog converter (DAC) 404, a first mixer 406, a second mixer 408, and a splitter 410. The architecture 400 also includes a plurality of first amplifiers 412, a plurality of phase shifters 414, a plurality of second amplifiers 416, and an antenna array 418 that includes a plurality of antenna elements 420. Transmission lines or other waveguides, wires, traces, or the like are shown connecting the various components to illustrate how signals to be transmitted may travel between components. Boxes 422, 424, 426, and 428 indicate regions in the architecture 400 in which different types of signals travel or are processed. Specifically, box 422 indicates a region in which digital baseband signals travel or are processed, box 424 indicates a region in which analog baseband signals travel or are processed, box 426 indicates a region in which analog intermediate frequency (IF) signals travel or are processed, and box 428 indicates a region in which analog radio frequency (RF) signals travel or are processed. The architecture also includes a local oscillator A 430, a local oscillator B 432, and a communications manager 434.

Each of the antenna elements 420 may include one or more sub-elements (not shown) for radiating or receiving RF signals. For example, a single antenna element 420 may include a first sub-element cross-polarized with a second sub-element that can be used to independently transmit cross-polarized signals. The antenna elements 420 may include patch antennas or other types of antennas arranged in a linear, two dimensional, or other pattern. A spacing between antenna elements 420 may be such that signals with a desired wavelength transmitted separately by the antenna elements 420 may interact or interfere (e.g., to form a desired beam). For example, given an expected range of wavelengths or frequencies, the spacing may provide a quarter wavelength, half wavelength, or other fraction of a wavelength of spacing between neighboring antenna elements 420 to allow for interaction or interference of signals transmitted by the separate antenna elements 420 within that expected range.

The modem 402 processes and generates digital baseband signals and may also control operation of the DAC 404, first and second mixers 406, 408, splitter 410, first amplifiers 412, phase shifters 414, and/or the second amplifiers 416 to transmit signals via one or more or all of the antenna elements 420. The modem 402 may process signals and control operation in accordance with a communication standard such as a wireless standard discussed herein. The DAC 404 may convert digital baseband signals received from the modem 402 (and that are to be transmitted) into analog baseband signals. The first mixer 406 upconverts analog baseband signals to analog IF signals within an IF using a local oscillator A 430. For example, the first mixer 406 may mix the signals with an oscillating signal generated by the local oscillator A 430 to "move" the baseband analog signals to the IF. In some cases, some processing or filtering (not shown) may take place at the IF. The second mixer 408 upconverts the analog IF signals to analog RF signals using the local oscillator B 432. Similarly to the first mixer, the second mixer 408 may mix the signals with an oscillating signal generated by the local oscillator B 432 to "move" the IF analog signals to the RF, or the frequency at which signals will be transmitted or received. The modem 402 and/or the communications manager 434 may adjust the frequency of local oscillator A 430 and/or the local oscillator B 432 so that a desired IF and/or RF frequency is produced and used to facilitate processing and transmission of a signal within a desired bandwidth.

In the illustrated architecture 400, signals upconverted by the second mixer 408 are split or duplicated into multiple signals by the splitter 410. The splitter 410 in architecture 400 splits the RF signal into a plurality of identical or nearly identical RF signals, as denoted by its presence in box 428. In other examples, the split may take place with any type of signal including with baseband digital, baseband analog, or IF analog signals. Each of these signals may correspond to an antenna element 420 and the signal travels through and is processed by amplifiers 412, 416, phase shifters 414, and/or other elements corresponding to the respective antenna element 420 to be provided to and transmitted by the corresponding antenna element 420 of the antenna array 418. In one example, the splitter 410 may be an active splitter that is connected to a power supply and provides some gain so that RF signals exiting the splitter 410 are at a power level equal to or greater than the signal entering the splitter 410. In another example, the splitter 410 is a passive splitter that is not connected to power supply and the RF signals exiting the splitter 410 may be at a power level lower than the RF signal entering the splitter 410.

After being split by the splitter 410, the resulting RF signals may enter an amplifier, such as a first amplifier 412, or a phase shifter 414 corresponding to an antenna element 420. The first and second amplifiers 412, 416 are illustrated with dashed lines because one or both of them might not be necessary in some implementations. In one implementation, both the first amplifier 412 and second amplifier 414 are present. In another, neither the first amplifier 412 nor the second amplifier 414 is present. In other implementations, one of the two amplifiers 412, 414 is present but not the other. By way of example, if the splitter 410 is an active splitter, the first amplifier 412 may not be used. By way of further example, if the phase shifter 414 is an active phase shifter that can provide a gain, the second amplifier 416 might not be used. The amplifiers 412, 416 may provide a desired level of positive or negative gain. A positive gain (positive dB) may be used to increase an amplitude of a signal for radiation by a specific antenna element 420. A negative gain (negative dB) may be used to decrease an amplitude and/or suppress radiation of the signal by a specific antenna element. Each of the amplifiers 412, 416 may be controlled independently (e.g., by the modem 402 or communications manager 434) to provide independent control of the gain for each antenna element 420. For example, the modem 402 and/or the communications manager 434 may have at least one control line connected to each of the splitter 410, first amplifiers 412, phase shifters 414, and/or second amplifiers 416 which may be used to configure a gain to provide a desired amount of gain for each component and thus each antenna element 420.

The phase shifter 414 may provide a configurable phase shift or phase offset to a corresponding RF signal to be transmitted. The phase shifter 414 could be a passive phase shifter not directly connected to a power supply. Passive phase shifters might introduce some insertion loss. The second amplifier 416 could boost the signal to compensate for the insertion loss. The phase shifter 414 could be an active phase shifter connected to a power supply such that the active phase shifter provides some amount of gain or prevents insertion loss. The settings of each of the phase shifters 414 are independent meaning that each can be set to provide a desired amount of phase shift or the same amount of phase shift or some other configuration. The modem 402 and/or the communications manager 434 may have at least one control line connected to each of the phase shifters 414 and which may be used to configure the phase shifters 414 to provide a desired amounts of phase shift or phase offset between antenna elements 420.

In the illustrated architecture 400, RF signals received by the antenna elements 420 are provided to one or more of first amplifier 456 to boost the signal strength. The first amplifier 456 may be connected to the same antenna arrays 418, e.g., for TDD operations. The first amplifier 456 may be connected to different antenna arrays 418. The boosted RF signal is input into one or more of phase shifter 454 to provide a configurable phase shift or phase offset for the corresponding received RF signal. The phase shifter 454 may be an active phase shifter or a passive phase shifter. The settings of the phase shifters 454 are independent, meaning that each can be set to provide a desired amount of phase shift or the same amount of phase shift or some other configuration. The modem 402 and/or the communications manager 434 may have at least one control line connected to each of the phase shifters 454 and which may be used to configure the phase sifters 454 to provide a desired amount of phase shift or phase offset between antenna elements 420.

The outputs of the phase shifters 454 may be input to one or more second amplifiers 452 for signal amplification of the phase shifted received RF signals. The second amplifiers 452 may be individually configured to provide a configured amount of gain. The second amplifiers 452 may be individually configured to provide an amount of gain to ensure that the signal input to combiner 450 have the same magnitude. The amplifiers 452 and/or 456 are illustrated in dashed lines because they might not be necessary in some implementations. In one implementation, both the amplifier 452 and the amplifier 456 are present. In another, neither the amplifier 452 nor the amplifier 456 are present. In other implementations, one of the amplifiers 452, 456 is present but not the other.

In the illustrated architecture 400, signals output by the phase shifters 454 (via the amplifiers 452 when present) are combined in combiner 450. The combiner 450 in architecture combines the RF signal into a signal, as denoted by its presence in box 428. The combiner 450 may be a passive combiner (e.g., not connected to a power source), which may result in some insertion loss. The combiner 450 may be an active combiner, e.g., connected to a power source, which may result in some signal gain. When combiner 450 is an active combiner, it may provide a different (e.g., configurable) amount of gain for each input signal so that the input signals have the same magnitude when they are combined. When combiner 450 is an active combiner, it may not need the second amplifier 452 because the active combiner may provide the signal amplification.

The output of the combiner 450 is input into mixers 448 and 446. Mixers 448 and 446 generally down convert the received RF signal using inputs from local oscillators 472 and 470, respectively, to create intermediate or baseband signals that carry the encoded and modulated information. The output of the mixers 448 and 446 are input into an analog-to-digital converter (ADC) 444 for conversion to analog signals. The analog signals output from ADC 444 is input to modem 402 for baseband processing, e.g., decoding, de-interleaving, etc.

The architecture 400 is given by way of example only to illustrate an architecture for transmitting and/or receiving signals. It will be understood that the architecture 400 and/or each portion of the architecture 400 may be repeated multiple times within an architecture to accommodate or provide an arbitrary number of RF chains, antenna elements, and/or antenna panels. Furthermore, numerous alternate architectures are possible and contemplated. For example, although only a single antenna array 418 is shown, two, three, or more antenna arrays may be included each with one or more of their own corresponding amplifiers, phase shifters, splitters, mixers, DACs, ADCs, and/or modems. For example, a single UE may include two, four or more antenna arrays for transmitting or receiving signals at different physical locations on the UE or in different directions. Furthermore, mixers, splitters, amplifiers, phase shifters and other components may be located in different signal type areas (e.g., different ones of the boxes 422, 424, 426, 428) in different implemented architectures. For example, a split of the signal to be transmitted into a plurality of signals may take place at the analog RF, analog IF, analog baseband, or digital baseband frequencies in different examples. Similarly, amplification, and/or phase shifts may also take place at different frequencies. For example, in some contemplated implementations, one or more of the splitter 410, amplifiers 412, 416, or phase shifters 414 may be located between the DAC 404 and the first mixer 406 or between the first mixer 406 and the second mixer 408. In one example, the functions of one or more of the components may be combined into one component. For example, the phase shifters 414 may perform amplification to include or replace the first and/or or second amplifiers 412, 416. By way of another example, a phase shift may be implemented by the second mixer 408 to obviate the need for a separate phase shifter 414. This technique is sometimes called local oscillator (LO) phase shifting. In one implementation of this configuration, there may be a plurality of IF to RF mixers (e.g., for each antenna element chain) within the second mixer 408 and the local oscillator B 432 would supply different local oscillator signals (with different phase offsets) to each IF to RF mixer.

The modem 402 and/or the communications manager 434 may control one or more of the other components 404-472 to select one or more antenna elements 420 and/or to form beams for transmission of one or more signals. For example, the antenna elements 420 may be individually selected or deselected for transmission of a signal (or signals) by controlling an amplitude of one or more corresponding amplifiers, such as the first amplifiers 412 and/or the second amplifiers 416. Beamforming includes generation of a beam using a plurality of signals on different antenna elements where one or more or all of the plurality signals are shifted in phase relative to each other. The formed beam may carry physical or higher layer reference signals or information. As each signal of the plurality of signals is radiated from a respective antenna element 420, the radiated signals interact, interfere (constructive and destructive interference), and amplify each other to form a resulting beam. The shape (such as the amplitude, width, and/or presence of side lobes) and the direction (such as an angle of the beam relative to a surface of the antenna array 418) can be dynamically controlled by modifying the phase shifts or phase offsets imparted by the phase shifters 414 and amplitudes imparted by the amplifiers 412, 416 of the plurality of signals relative to each other.

The communications manager 434 may, when architecture 400 is configured as a receiving device, transmit a first beam measurement report to a first wireless device, the first beam measurement report indicating a first set of beam measurements for a wireless channel between the first wireless device and the second wireless device. The communications manager 434 may receive from the first wireless device a cluster validity metric for at least one beam in the first beam measurement report. The communications manager 434 may transmit to the first wireless device a second beam measurement report based at least in part on the cluster validity metric, the second beam measurement report indicating a second set of beam measurements for the wireless channel, as discussed herein. The communications manager 434 may, when architecture 400 is configured as a transmitting device, receive a first beam measurement report from a second wireless device, the first beam measurement report indicating a first set of beam measurements for a wireless channel between the first wireless device and the second wireless device. The communications manager 434 may transmit to the second wireless device a cluster validity metric for at least one beam in the first beam measurement report. The communications manager 434 may receive from the second wireless device, in response to transmitting the cluster validity metric, a second beam measurement report indicating a second set of beam measurements for the wireless channel. The communications manager 434 may select a beam for transmitting to the second wireless device based at least in part on the first and second beam measurement reports, as discussed herein. The communications manager 434 may be located partially or fully within one or more other components of the architecture 400. For example, the communications manager 434 may be located within the modem 402 in at least one implementation.

Figure 5:
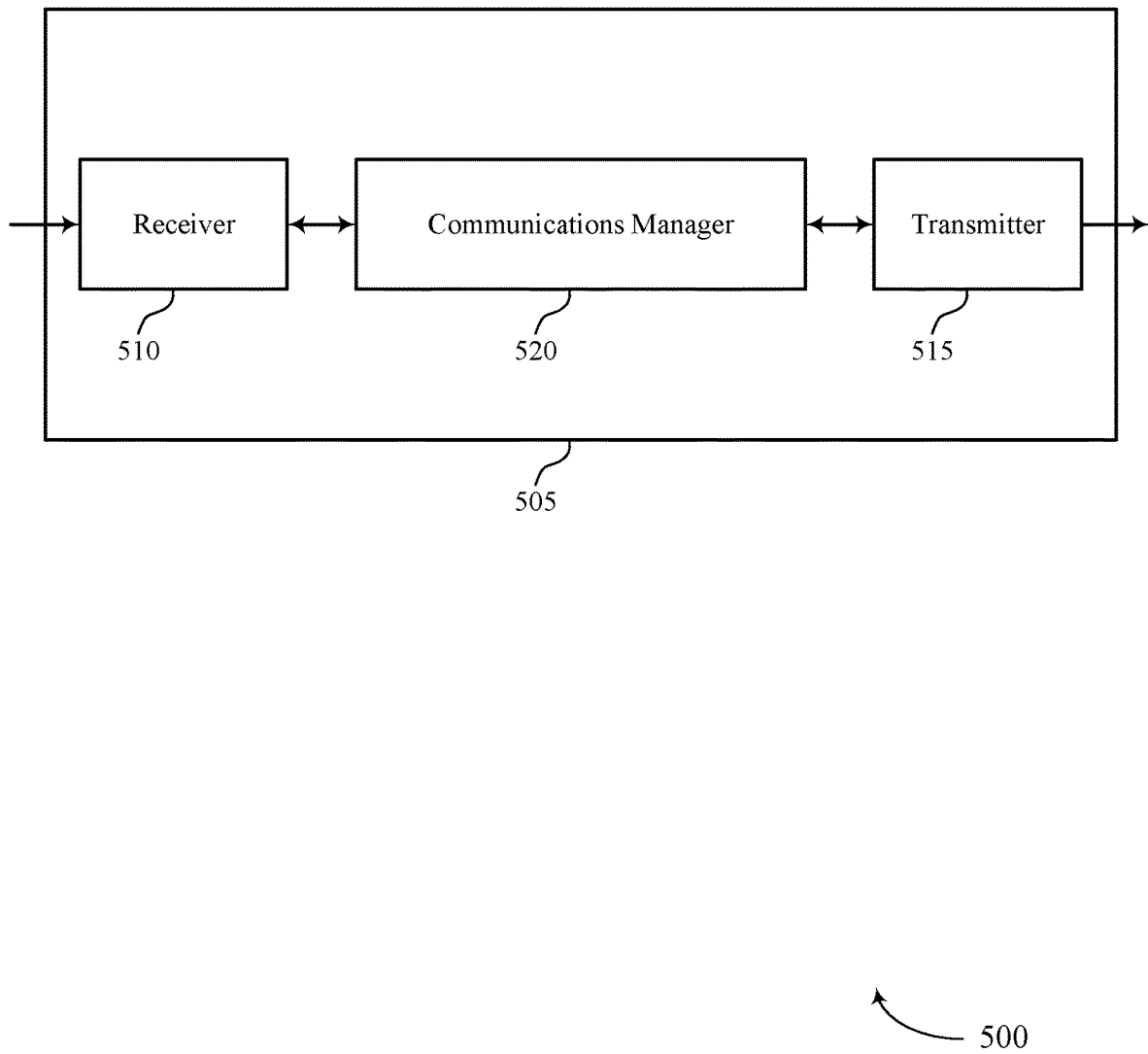
FIGS. 5 and 6 show block diagrams of devices that support techniques for signaling a common downlink and uplink beam in accordance with aspects of the present disclosure.

FIG. 5 shows a block diagram 500 of a device 505 that supports techniques for signaling a common downlink and uplink beam in accordance with aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to techniques for signaling a common downlink and uplink beam). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to techniques for signaling a common downlink and uplink beam). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of techniques for signaling a common downlink and uplink beam as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communication at a UE in accordance with examples as disclosed herein. For example, the communications manager 520 may be configured as or otherwise support a means for receiving, from a base station, a first DCI message scheduling a first transmission between the UE and the base station, the first DCI message including an indication of a first beam associated with the first transmission and a second beam associated with a second transmission, the second beam associated with the first beam. The communications manager 520 may be configured as or otherwise support a means for communicating with the base station via the second beam associated with the second transmission based on the first DCI message including the indication of the second beam. The second transmission may be scheduled by a second message different from the first DCI message.

By including or configuring the communications manager 520 in accordance with examples as described herein, the device 505 (e.g., a processor controlling or otherwise coupled to the receiver 510, the transmitter 515, the communications manager 520, or a combination thereof) may support signaling which enables multiple beams (e.g., downlink beams, uplink beams) to be configured and/or adjusted via a single control message (e.g., DCI message). By providing for multiple beams to be configured according to a single control message (e.g., DCI message), techniques described herein may reduce control signaling overhead and improve resource utilization in the wireless communications system. Additionally, by reducing the amount of signaling used to configure multiple beams, power consumption at the UE 115 may be reduced.

Figure 6:
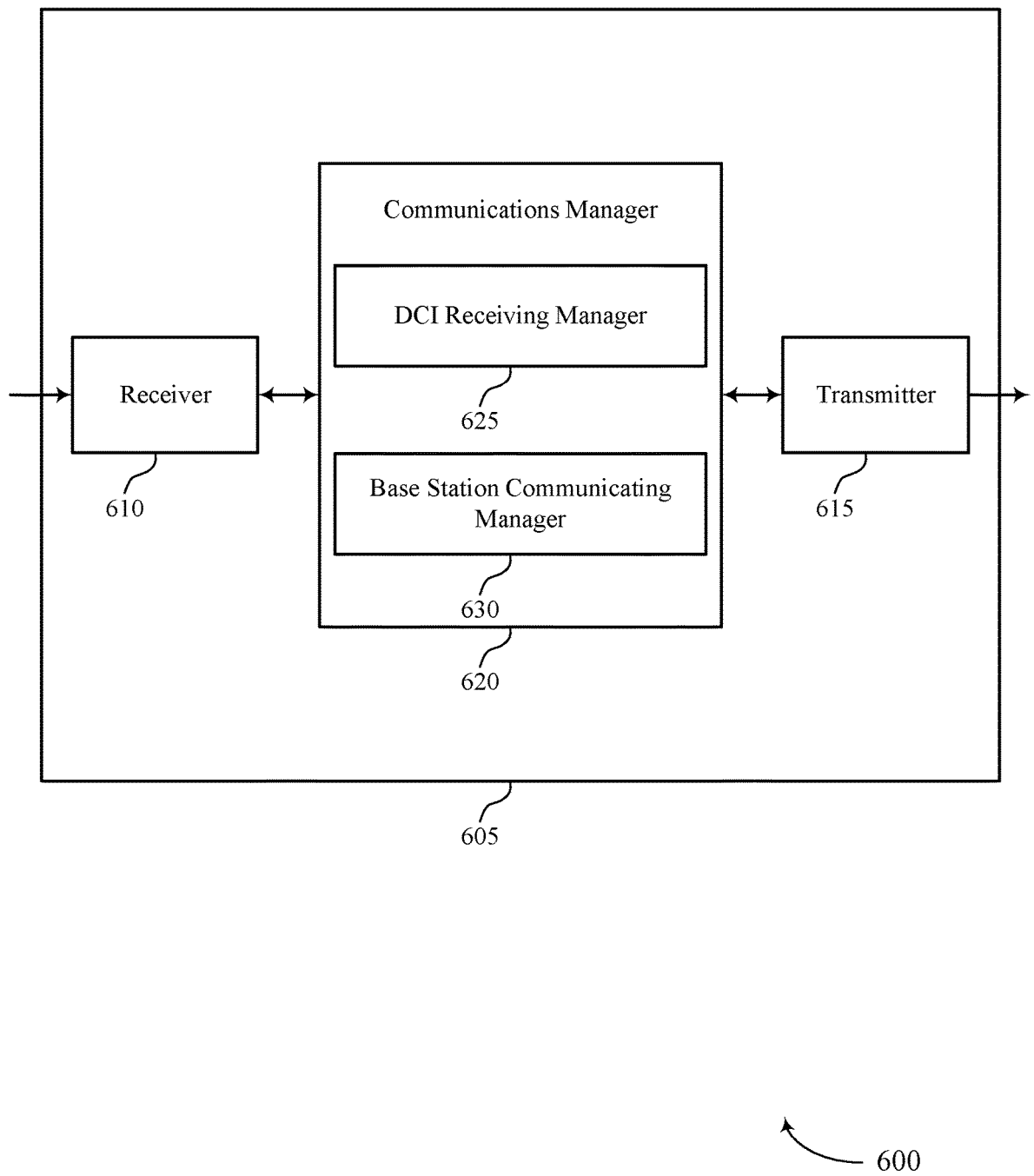

FIG. 6 shows a block diagram 600 of a device 605 that supports techniques for signaling a common downlink and uplink beam in accordance with aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to techniques for signaling a common downlink and uplink beam). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to techniques for signaling a common downlink and uplink beam). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of techniques for signaling a common downlink and uplink beam as described herein. For example, the communications manager 620 may include a DCI receiving manager 625 a base station communicating manager 630, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at a UE in accordance with examples as disclosed herein. The DCI receiving manager 625 may be configured as or otherwise support a means for receiving, from a base station, a first DCI message scheduling a first transmission between the UE and the base station, the first DCI message including an indication of a first beam associated with the first transmission and a second beam associated with a second transmission, the second beam associated with the first beam. The base station communicating manager 630 may be configured as or otherwise support a means for communicating with the base station via the second beam associated with the second transmission based on the first DCI message including the indication of the second beam. The second transmission may be scheduled by a second message different from the first DCI message.

Figure 7:
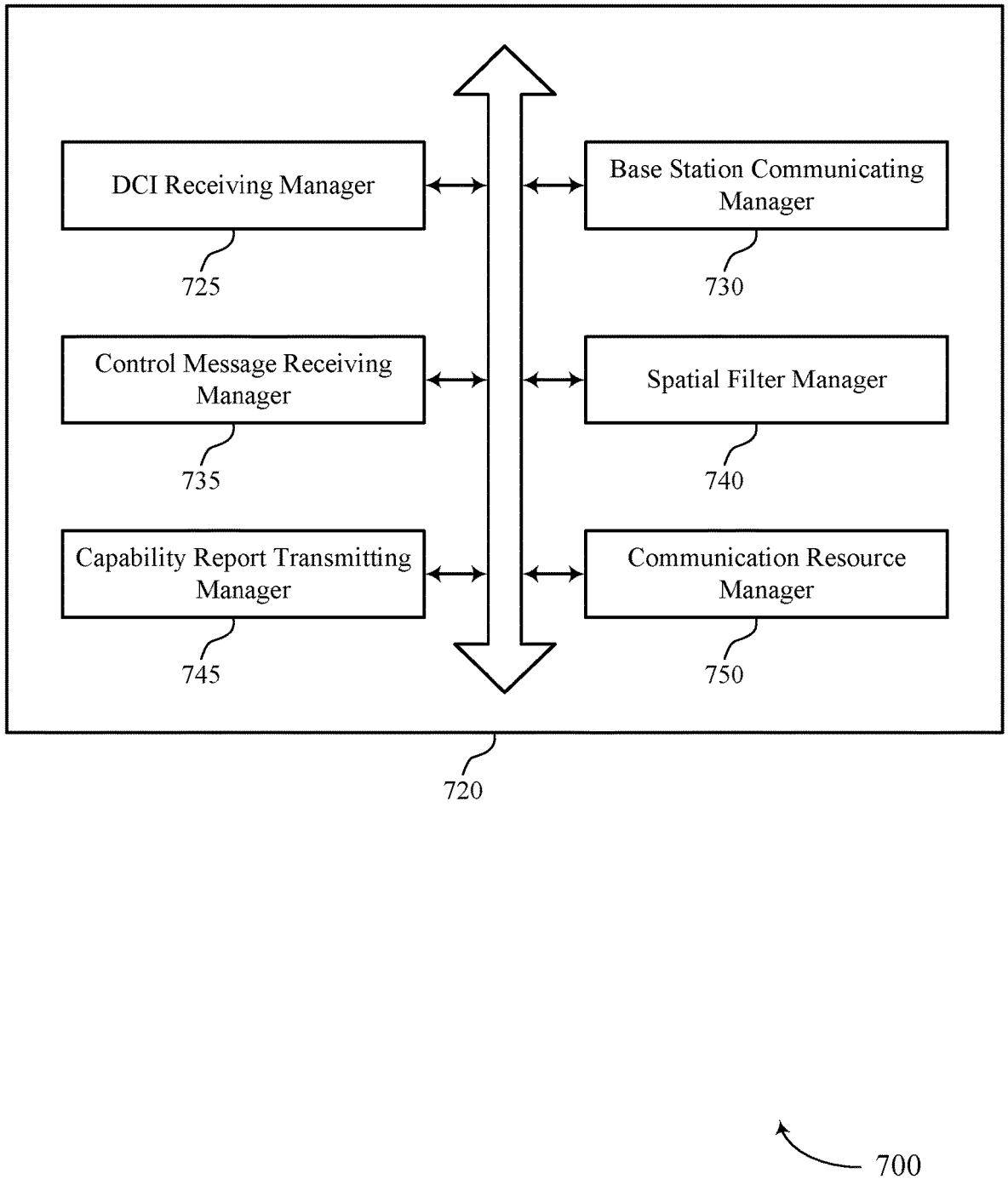
FIG. 7 shows a block diagram of a communications manager that supports techniques for signaling a common downlink and uplink beam in accordance with aspects of the present disclosure.

FIG. 7 shows a block diagram 700 of a communications manager 720 that supports techniques for signaling a common downlink and uplink beam in accordance with aspects of the present disclosure. The communications manager 720 may be an example of aspects of a communications manager 520, a communications manager 620, or both, as described herein. The communications manager 720, or various components thereof, may be an example of means for performing various aspects of techniques for signaling a common downlink and uplink beam as described herein. For example, the communications manager 720 may include a DCI receiving manager 725, a base station communicating manager 730, a control message receiving manager 735, a spatial filter manager 740, a capability report transmitting manager 745, a communication resource manager 750, or any combination thereof. Each of these components may communicate, directly or indirectly, with one another (e.g., via one or more buses).

The communications manager 720 may support wireless communication at a UE in accordance with examples as disclosed herein. The DCI receiving manager 725 may be configured as or otherwise support a means for receiving, from a base station, a first DCI message scheduling a first transmission between the UE and the base station, the first DCI message including an indication of a first beam associated with the first transmission and a second beam associated with a second transmission, the second beam associated with the first beam. The base station communicating manager 730 may be configured as or otherwise support a means for communicating with the base station via the second beam associated with the second transmission based on the first DCI message including the indication of the second beam. The second transmission may be scheduled by a second message different from the first DCI message.

In some examples, the DCI receiving manager 725 may be configured as or otherwise support a means for receiving, via the first DCI message, an indication of the second transmission associated with the second beam, where communicating with the base station via the second beam is based on receiving the indication of the second transmission.

In some examples, the control message receiving manager 735 may be configured as or otherwise support a means for receiving, from the base station, a control message including an indication of a relationship between the first transmission and the second transmission, where communicating with the base station via the second beam is based on receiving the control message. In some examples, the second transmission includes a HARQ response associated with the first transmission. In some examples, the first transmission and the second transmission are scheduled within a common component carrier, within a common BWP, or both. In some examples, the first transmission and the second transmission are scheduled within a common set of component carriers, within a common set of BWPs, or both. In some examples, the indication of the second beam associated with the first beam includes one or more bit field values within the first DCI message. In some examples, the one or more bit fields includes a TCI state field.

In some examples, the base station communicating manager 730 may be configured as or otherwise support a means for communicating with the base station via the first beam associated with the first transmission based on receiving the first DCI message. In some examples, the indication of the second beam associated with the first beam includes a TCI state associated with the second beam. In some examples, the first beam and the second beam are associated with a common TCI state. In some examples, the first beam is associated with a first TCI state. In some examples, the second beam is associated with a second TCI state different from the first TCI state. In some examples, the first beam is the same as the second beam.

In some examples, the spatial filter manager 740 may be configured as or otherwise support a means for determining a spatial filter associated with the first beam based on the first DCI message, where communicating with the base station via the second beam is based on the determined spatial filter.

In some examples, the DCI receiving manager 725 may be configured as or otherwise support a means for receiving, from the base station, a third DCI message scheduling a third transmission between the UE and the base station. In some examples, the base station communicating manager 730 may be configured as or otherwise support a means for communicating with the base station via the third transmission based on the first beam, the second beam, or both, where communicating with the base station via the third transmission is based on receiving the first DCI message, the third DCI message, or both.

In some examples, the DCI receiving manager 725 may be configured as or otherwise support a means for determining that the third DCI message does not include a TCI state associated with the third transmission, where communicating with the base station via the third transmission is based on determining that the third DCI message does not include the TCI state associated with the third transmission.

In some examples, the communication resource manager 750 may be configured as or otherwise support a means for determining that the third transmission and one or more of the first transmission or the second transmission are scheduled in a common set of component carriers, a common set of BWPs, or both, where communicating with the base station via the third transmission is based on determining that the third transmission and one or more of the first transmission or the second transmission are scheduled in the common set of component carriers, the common set of BWPs, or both.

In some examples, the capability report transmitting manager 745 may be configured as or otherwise support a means for transmitting, to the base station, a capability report indicating a capability of the UE to selectively adjust the second beam scheduled by the second message based on the first DCI message, where communicating with the base station via the second beam is based on transmitting the capability report.

In some examples, the control message receiving manager 735 may be configured as or otherwise support a means for receiving, from the base station, an indication of a configuration for selectively adjusting beams associated with transmissions via DCI messages which did not schedule the transmissions, where communication with the base station via the second beam is based on receiving the indication of the configuration.

In some examples, the first transmission includes a downlink transmission. In some examples, the second transmission includes an uplink transmission. In some examples, the first transmission includes an uplink transmission. In some examples, the second transmission includes a downlink transmission. In some examples, the first transmission, the second transmission, or both, includes one or more of a PUSCH transmission, a PUCCH transmission, an SRS, a PDSCH transmission, or a CSI-RS.

Figure 8:
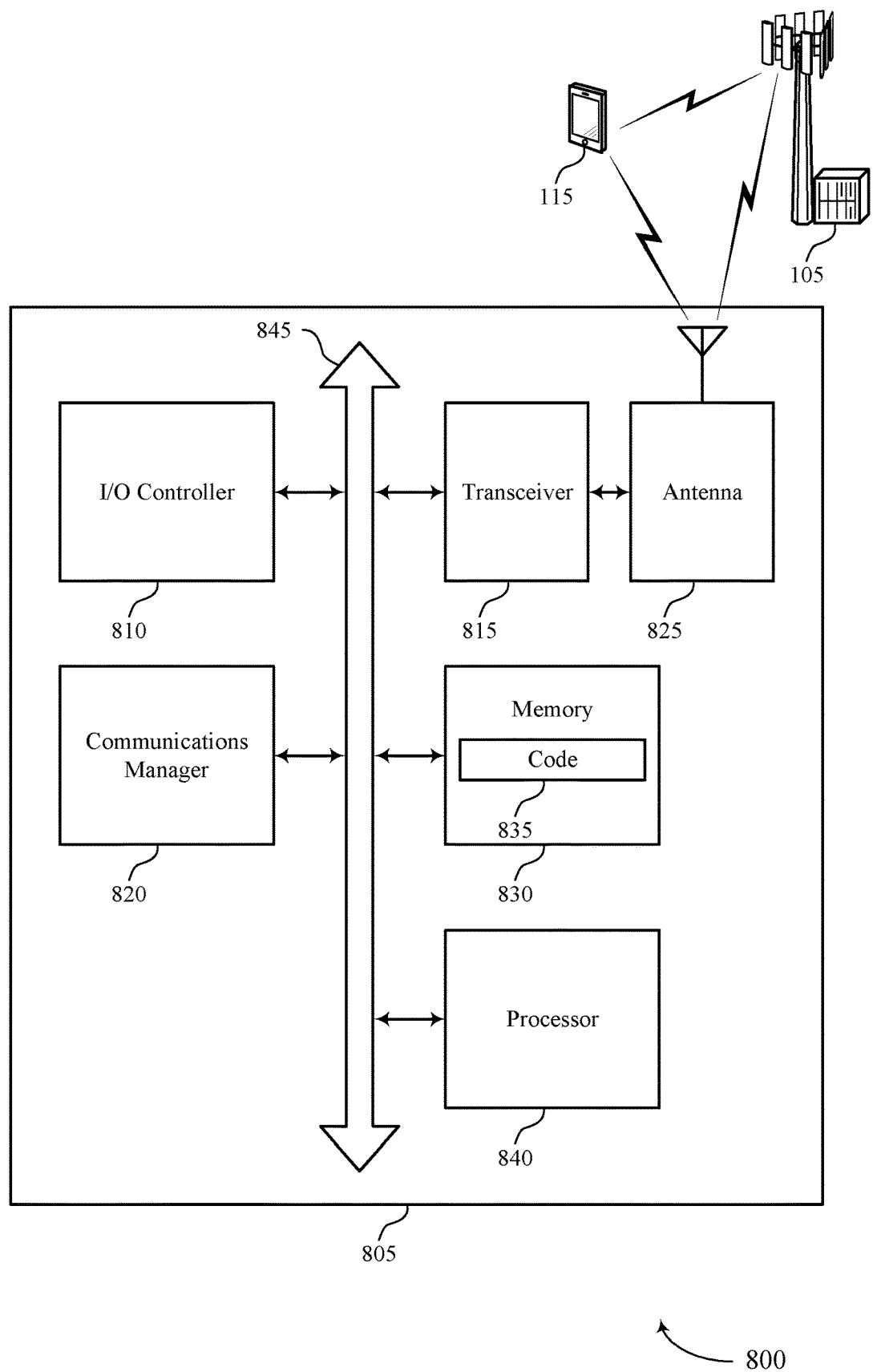
FIG. 8 shows a diagram of a system including a device that supports techniques for signaling a common downlink and uplink beam in accordance with aspects of the present disclosure.

FIG. 8 shows a diagram of a system 800 including a device 805 that supports techniques for signaling a common downlink and uplink beam in accordance with aspects of the present disclosure. The device 805 may be an example of or include the components of a device 505, a device 605, or a UE 115 as described herein. The device 805 may communicate wirelessly with one or more base stations 105, UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting techniques for signaling a common downlink and uplink beam). For example, the device 805 or a component of the device 805 may include a processor 840 and memory 830 coupled to the processor 840, the processor 840 and memory 830 configured to perform various functions described herein.

The communications manager 820 may support wireless communication at a UE in accordance with examples as disclosed herein. For example, the communications manager 820 may be configured as or otherwise support a means for receiving, from a base station, a first DCI message scheduling a first transmission between the UE and the base station, the first DCI message including an indication of a first beam associated with the first transmission and a second beam associated with a second transmission, the second beam associated with the first beam. The communications manager 820 may be configured as or otherwise support a means for communicating with the base station via the second beam associated with the second transmission based on the first DCI message including the indication of the second beam, where the second transmission is scheduled by a second message different from the first DCI message.

By including or configuring the communications manager 820 in accordance with examples as described herein, the device 805 may support techniques for signaling which enables multiple beams (e.g., downlink beams, uplink beams) to be configured and/or adjusted via a single control message (e.g., DCI message). By providing for multiple beams to be configured according to a single control message (e.g., DCI message), techniques described herein may reduce control signaling overhead and improve resource utilization in the wireless communications system. Addictingly, techniques described herein may reduce the signaling and thereby reduce the time required to configure multiple beams, which may reduce latency and improve efficiency of wireless communications. Furthermore, by reducing the amount of signaling used to configure multiple beams, power consumption at the UE 115 may be reduced, which may improve battery performance at the UE 115.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of techniques for signaling a common downlink and uplink beam as described herein, or the processor 840 and the memory 830 may be otherwise configured to perform or support such operations.

Figure 9:
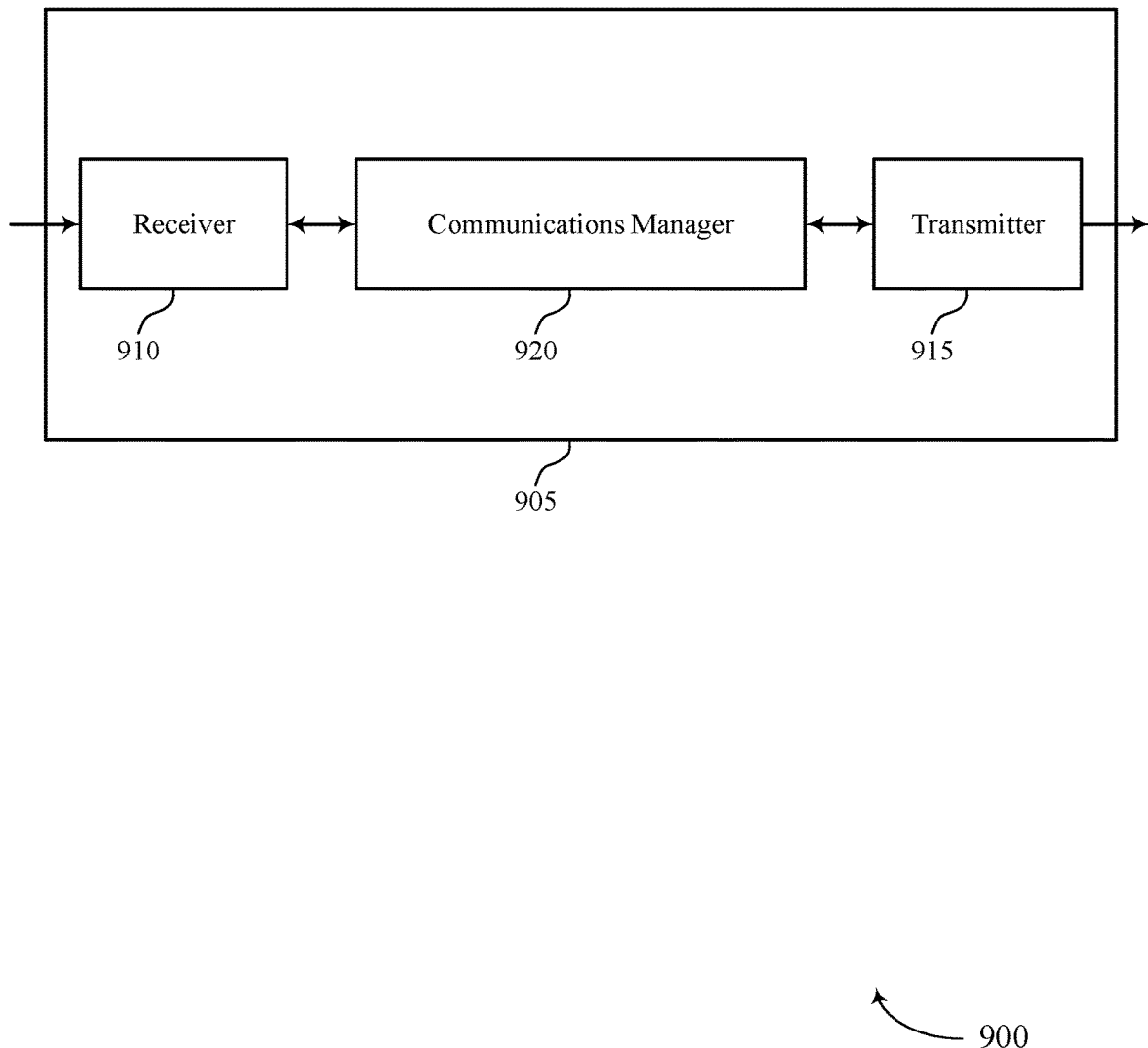
FIGS. 9 and 10 show block diagrams of devices that support techniques for signaling a common downlink and uplink beam in accordance with aspects of the present disclosure.

FIG. 9 shows a block diagram 900 of a device 905 that supports techniques for signaling a common downlink and uplink beam in accordance with aspects of the present disclosure. The device 905 may be an example of aspects of a base station 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to techniques for signaling a common downlink and uplink beam). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to techniques for signaling a common downlink and uplink beam). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of techniques for signaling a common downlink and uplink beam as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 920 may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communication at a base station in accordance with examples as disclosed herein. For example, the communications manager 920 may be configured as or otherwise support a means for transmitting, to a UE, a first DCI message scheduling a first transmission between a UE and the base station, the first DCI message including an indication of a first beam associated with the first transmission and a second beam associated with a second transmission, the second beam associated with the first beam. The communications manager 920 may be configured as or otherwise support a means for communicating with the UE via the second beam associated with the second transmission based on the first DCI message including the indication of the second beam, where the second transmission is scheduled by a second message different from the first DCI message.

By including or configuring the communications manager 920 in accordance with examples as described herein, the device 905 (e.g., a processor controlling or otherwise coupled to the receiver 910, the transmitter 915, the communications manager 920, or a combination thereof) may support techniques for support signaling which enables multiple beams (e.g., downlink beams, uplink beams) to be configured and/or adjusted via a single control message (e.g., DCI message). By providing for multiple beams to be configured according to a single control message (e.g., DCI message), techniques described herein may reduce control signaling overhead and improve resource utilization in the wireless communications system. Additionally, by reducing the amount of signaling used to configure multiple beams, power consumption at the base station 105 may be reduced.

Figure 10:
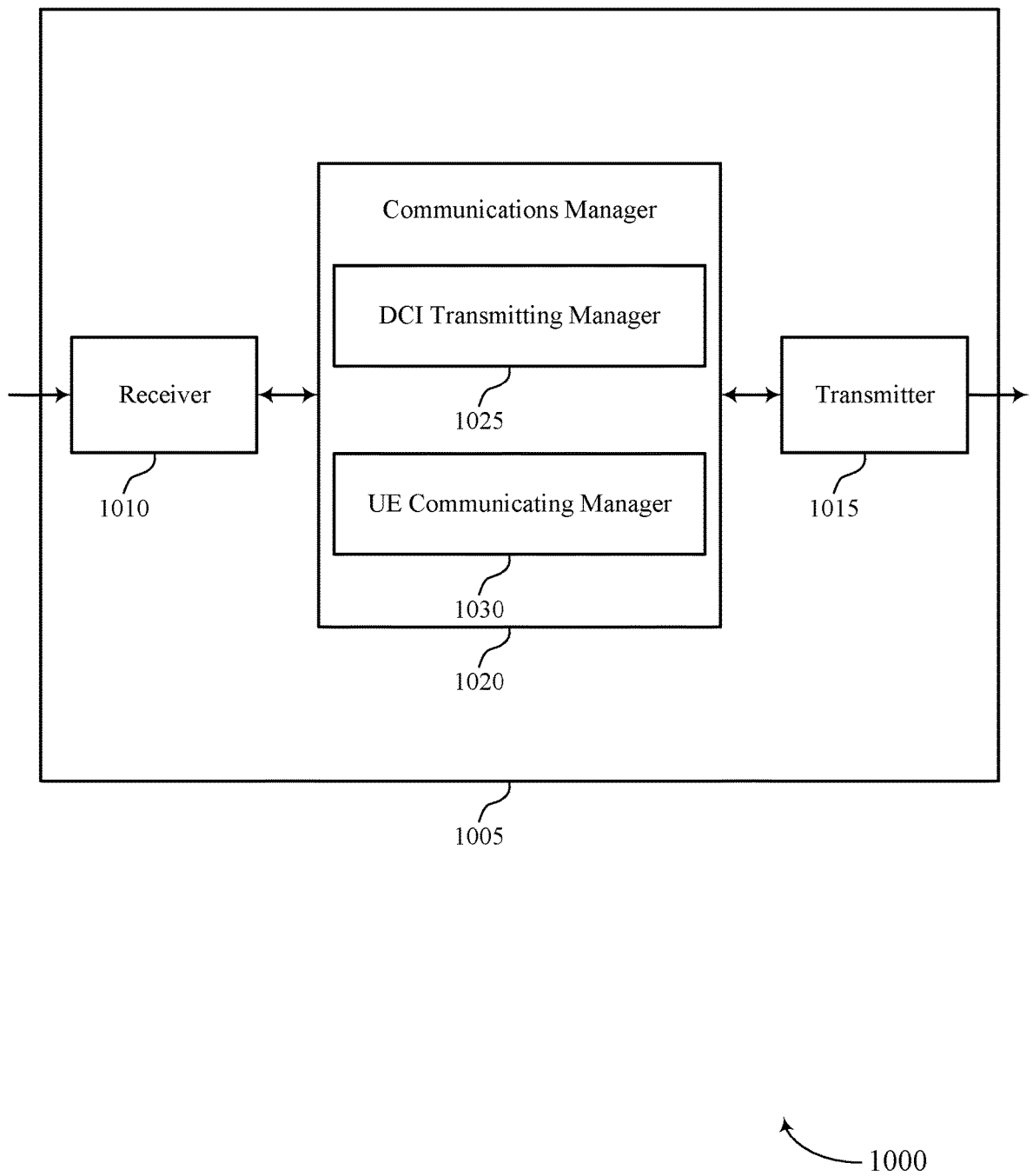

FIG. 10 shows a block diagram 1000 of a device 1005 that supports techniques for signaling a common downlink and uplink beam in accordance with aspects of the present disclosure. The device 1005 may be an example of aspects of a device 905 or a base station 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to techniques for signaling a common downlink and uplink beam). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to techniques for signaling a common downlink and uplink beam). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of techniques for signaling a common downlink and uplink beam as described herein. For example, the communications manager 1020 may include a DCI transmitting manager 1025 a UE communicating manager 1030, or any combination thereof. The communications manager 1020 may be an example of aspects of a communications manager 920 as described herein. In some examples, the communications manager 1020, or various components thereof, may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communication at a base station in accordance with examples as disclosed herein. The DCI transmitting manager 1025 may be configured as or otherwise support a means for transmitting, to a UE, a first DCI message scheduling a first transmission between a UE and the base station, the first DCI message including an indication of a first beam associated with the first transmission and a second beam associated with a second transmission, the second beam associated with the first beam. The UE communicating manager 1030 may be configured as or otherwise support a means for communicating with the UE via the second beam associated with the second transmission based on the first DCI message including the indication of the second beam, where the second transmission is scheduled by a second message different from the first DCI message.

Figure 11:
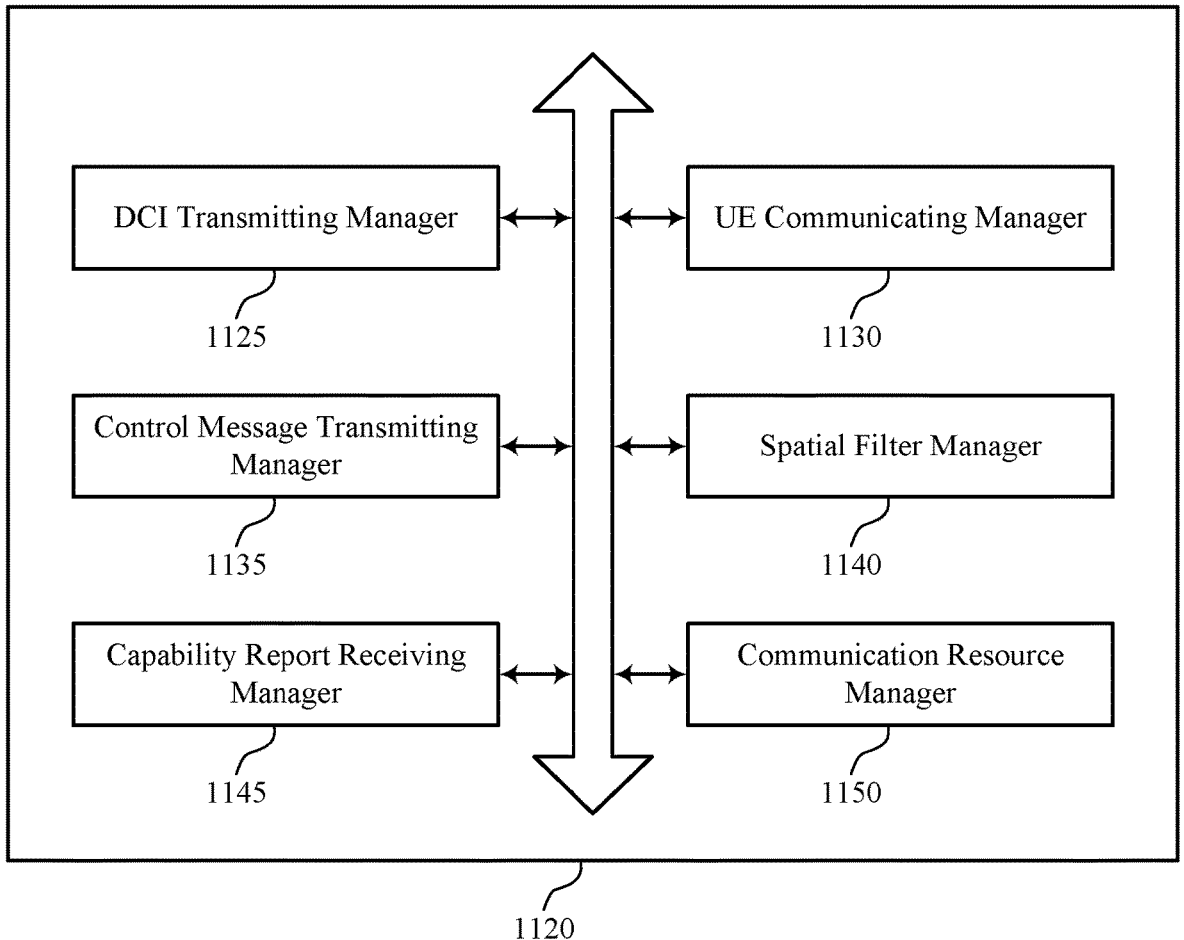
FIG. 11 shows a block diagram of a communications manager that supports techniques for signaling a common downlink and uplink beam in accordance with aspects of the present disclosure.

FIG. 11 shows a block diagram 1100 of a communications manager 1120 that supports techniques for signaling a common downlink and uplink beam in accordance with aspects of the present disclosure. The communications manager 1120 may be an example of aspects of a communications manager 920, a communications manager 1020, or both, as described herein. The communications manager 1120, or various components thereof, may be an example of means for performing various aspects of techniques for signaling a common downlink and uplink beam as described herein. For example, the communications manager 1120 may include a DCI transmitting manager 1125, a UE communicating manager 1130, a control message transmitting manager 1135, a spatial filter manager 1140, a capability report receiving manager 1145, a communication resource manager 1150, or any combination thereof. Each of these components may communicate, directly or indirectly, with one another (e.g., via one or more buses).

The communications manager 1120 may support wireless communication at a base station in accordance with examples as disclosed herein. The DCI transmitting manager 1125 may be configured as or otherwise support a means for transmitting, to a UE, a first DCI message scheduling a first transmission between a UE and the base station, the first DCI message including an indication of a first beam associated with the first transmission and a second beam associated with a second transmission, the second beam associated with the first beam. The UE communicating manager 1130 may be configured as or otherwise support a means for communicating with the UE via the second beam associated with the second transmission based on the first DCI message including the indication of the second beam, where the second transmission is scheduled by a second message different from the first DCI message.

In some examples, the DCI transmitting manager 1125 may be configured as or otherwise support a means for transmitting, via the first DCI message, an indication of the second transmission associated with the second beam, where communicating with the UE via the second beam is based on transmitting the indication of the second transmission.

In some examples, the control message transmitting manager 1135 may be configured as or otherwise support a means for transmitting, to the UE, a control message including an indication of a relationship between the first transmission and the second transmission, where communicating with the UE via the second beam is based on transmitting the control message. In some examples, the second transmission includes a HARQ response associated with the first transmission. In some examples, the first transmission and the second transmission are scheduled within a common component carrier, within a common BWP, or both. In some examples, the first transmission and the second transmission are scheduled within a common set of component carriers, within a common set of BWPs, or both. In some examples, the indication of the second beam associated with the first beam includes one or more bit field values within the first DCI message. In some examples, the one or more bit fields includes a TCI state field.

In some examples, the UE communicating manager 1130 may be configured as or otherwise support a means for communicating with the UE via the first beam associated with the first transmission based on transmitting the first DCI message. In some examples, the indication of the second beam associated with the first beam includes a TCI state associated with the second beam. In some examples, the first beam and the second beam are associated with a common TCI state. In some examples, the first beam is associated with a first TCI state. In some examples, the second beam is associated with a second TCI state different from the first TCI state. In some examples, the first beam is the same as the second beam.

In some examples, the spatial filter manager 1140 may be configured as or otherwise support a means for determining a spatial filter associated with the first beam based on the first DCI message, where communicating with the UE via the second beam is based on the determined spatial filter.

In some examples, the DCI transmitting manager 1125 may be configured as or otherwise support a means for transmitting, to the UE, a third DCI message scheduling a third transmission between the UE and the base station. In some examples, the UE communicating manager 1130 may be configured as or otherwise support a means for communicating with the UE via the third transmission based on the first beam, the second beam, or both, where communicating with the UE via the third transmission is based on transmitting the first DCI message, the third DCI message, or both.

In some examples, the DCI transmitting manager 1125 may be configured as or otherwise support a means for determining that the third DCI message does not include a TCI state associated with the third transmission, where communicating with the UE via the third transmission is based on determining that the third DCI message does not include the TCI state associated with the third transmission.

In some examples, the communication resource manager 1150 may be configured as or otherwise support a means for determining that the third transmission and one or more of the first transmission or the second transmission are scheduled in a common set of component carriers, a common set of BWPs, or both, where communicating with the UE via the third transmission is based on determining that the third transmission and one or more of the first transmission or the second transmission are scheduled in the common set of component carriers, the common set of BWPs, or both.

In some examples, the capability report receiving manager 1145 may be configured as or otherwise support a means for receiving, from the UE, a capability report indicating a capability of the UE to selectively adjust the second beam scheduled by the second message based on the first DCI message, where communicating with the UE via the second beam is based on receiving the capability report.

In some examples, the control message transmitting manager 1135 may be configured as or otherwise support a means for transmitting, to the UE, an indication of a configuration for selectively adjusting beams associated with transmissions via DCI messages which did not schedule the transmissions, where communication with the UE via the second beam is based on transmitting the indication of the configuration. In some examples, the first transmission includes a downlink transmission. In some examples, the second transmission includes an uplink transmission. In some examples, the first transmission includes an uplink transmission. In some examples, the second transmission includes a downlink transmission. In some examples, the first transmission, the second transmission, or both, includes one or more of a PUSCH transmission, a PUCCH transmission, an SRS, a PDSCH transmission, or a CSI-RS.

Figure 12:
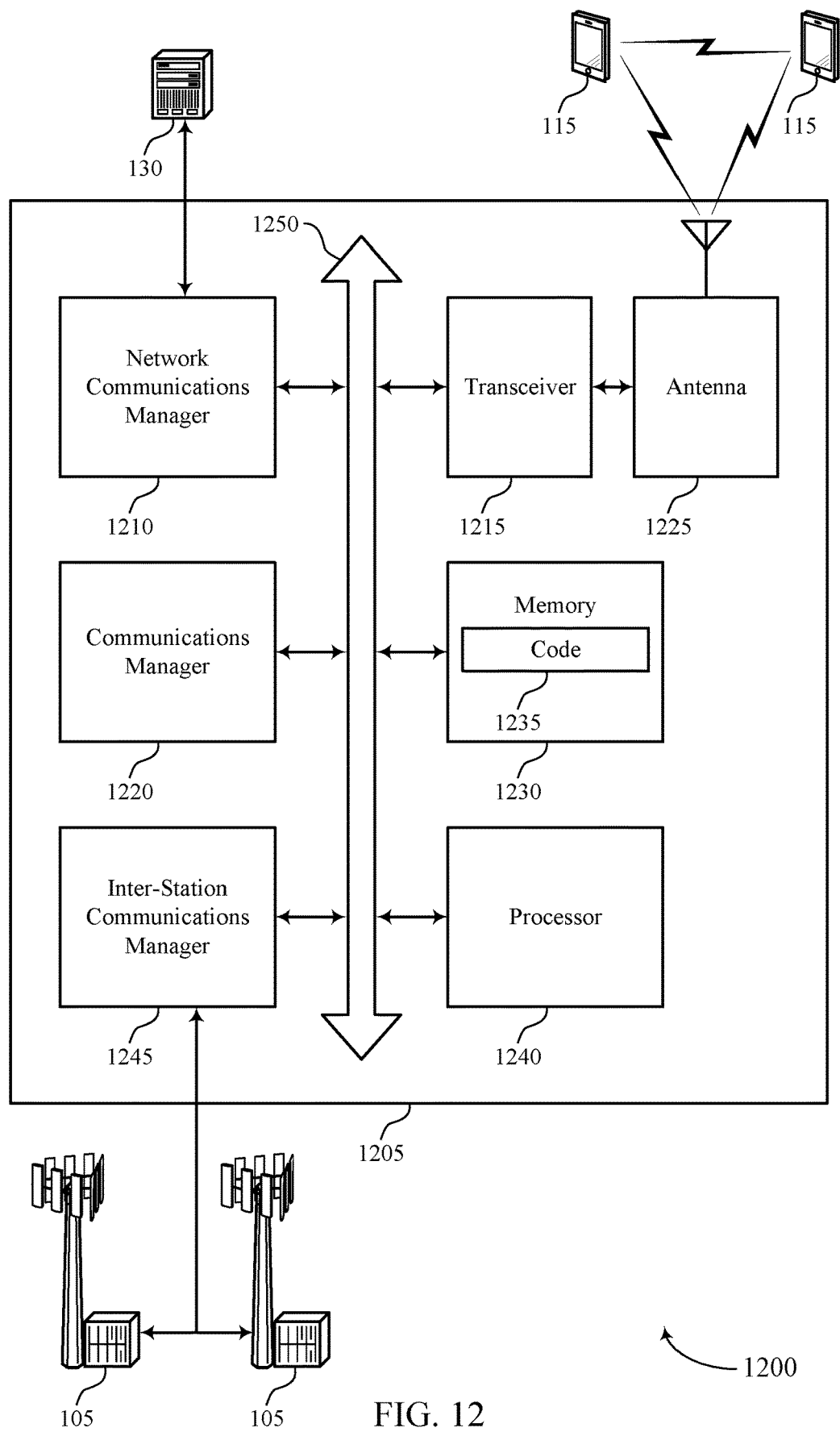
FIG. 12 shows a diagram of a system including a device that supports techniques for signaling a common downlink and uplink beam in accordance with aspects of the present disclosure.

FIG. 12 shows a diagram of a system 1200 including a device 1205 that supports techniques for signaling a common downlink and uplink beam in accordance with aspects of the present disclosure. The device 1205 may be an example of or include the components of a device 905, a device 1005, or a base station 105 as described herein. The device 1205 may communicate wirelessly with one or more base stations 105, UEs 115, or any combination thereof. The device 1205 may include components for bi-directional voice and data communications including components for transmitting and receiving communications, such as a communications manager 1220, a network communications manager 1210, a transceiver 1215, an antenna 1225, a memory 1230, code 1235, a processor 1240, and an inter-station communications manager 1245. These components may be in electronic communication or otherwise coupled (e.g., operatively, communicatively, functionally, electronically, electrically) via one or more buses (e.g., a bus 1250).

The network communications manager 1210 may manage communications with a core network 130 (e.g., via one or more wired backhaul links). For example, the network communications manager 1210 may manage the transfer of data communications for client devices, such as one or more UEs 115.

In some cases, the device 1205 may include a single antenna 1225. However, in some other cases the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include RAM and ROM. The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a BIOS which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting techniques for signaling a common downlink and uplink beam). For example, the device 1205 or a component of the device 1205 may include a processor 1240 and memory 1230 coupled to the processor 1240, the processor 1240 and memory 1230 configured to perform various functions described herein.

The inter-station communications manager 1245 may manage communications with other base stations 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communications network technology to provide communication between base stations 105.

The communications manager 1220 may support wireless communication at a base station in accordance with examples as disclosed herein. For example, the communications manager 1220 may be configured as or otherwise support a means for transmitting, to a UE, a first DCI message scheduling a first transmission between a UE and the base station, the first DCI message including an indication of a first beam associated with the first transmission and a second beam associated with a second transmission, the second beam associated with the first beam. The communications manager 1220 may be configured as or otherwise support a means for communicating with the UE via the second beam associated with the second transmission based on the first DCI message including the indication of the second beam, where the second transmission is scheduled by a second message different from the first DCI message.

By including or configuring the communications manager 1220 in accordance with examples as described herein, the device 1205 may support techniques for signaling which enables multiple beams (e.g., downlink beams, uplink beams) to be configured and/or adjusted via a single control message (e.g., DCI message). By providing for multiple beams to be configured according to a single control message (e.g., DCI message), techniques described herein may reduce control signaling overhead and improve resource utilization in the wireless communications system. Addictingly, techniques described herein may reduce the signaling and thereby reduce the time required to configure multiple beams, which may reduce latency and improve efficiency of wireless communications. Furthermore, by reducing the amount of signaling used to configure multiple beams, power consumption at the base station 105 may be reduced.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of techniques for signaling a common downlink and uplink beam as described herein, or the processor 1240 and the memory 1230 may be otherwise configured to perform or support such operations.

Figure 13:
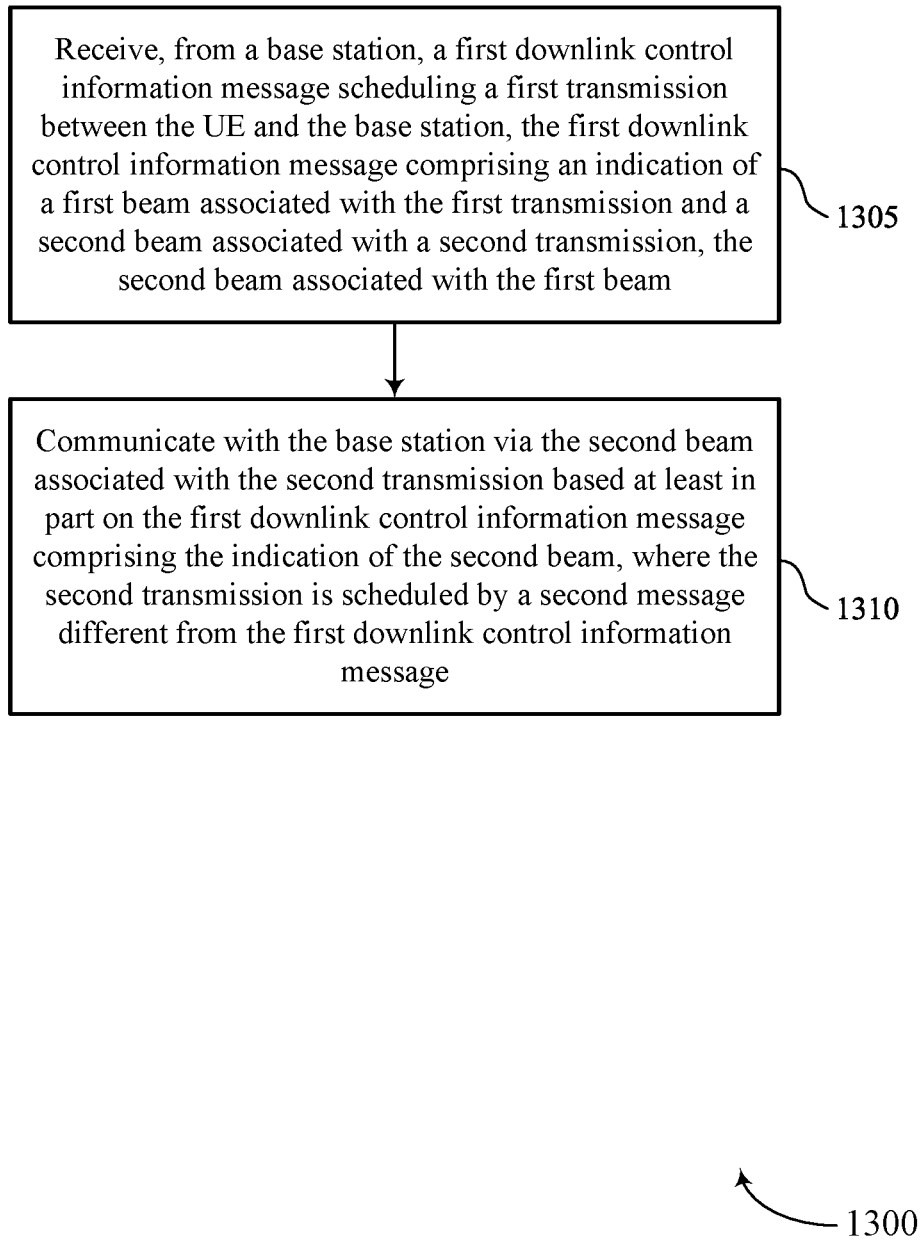
FIGS. 13 through 17 show flowcharts illustrating methods that support techniques for signaling a common downlink and uplink beam in accordance with aspects of the present disclosure.

FIG. 13 shows a flowchart illustrating a method 1300 that supports techniques for signaling a common downlink and uplink beam in accordance with aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1305, the method may include receiving, from a base station, a first DCI message scheduling a first transmission between the UE and the base station, the first DCI message including an indication of a first beam associated with the first transmission and a second beam associated with a second transmission, the second beam associated with the first beam. The operations of 1305 may be performed in accordance with examples as disclosed herein. In some examples, aspects of the operations of 1305 may be performed by a DCI receiving manager 725 as described with reference to FIG. 7.

At 1310, the method may include communicating with the base station via the second beam associated with the second transmission based on the first DCI message including the indication of the second beam, where the second transmission is scheduled by a second message different from the first DCI message. The operations of 1310 may be performed in accordance with examples as disclosed herein. In some examples, aspects of the operations of 1310 may be performed by a base station communicating manager 730 as described with reference to FIG. 7.

Figure 14:
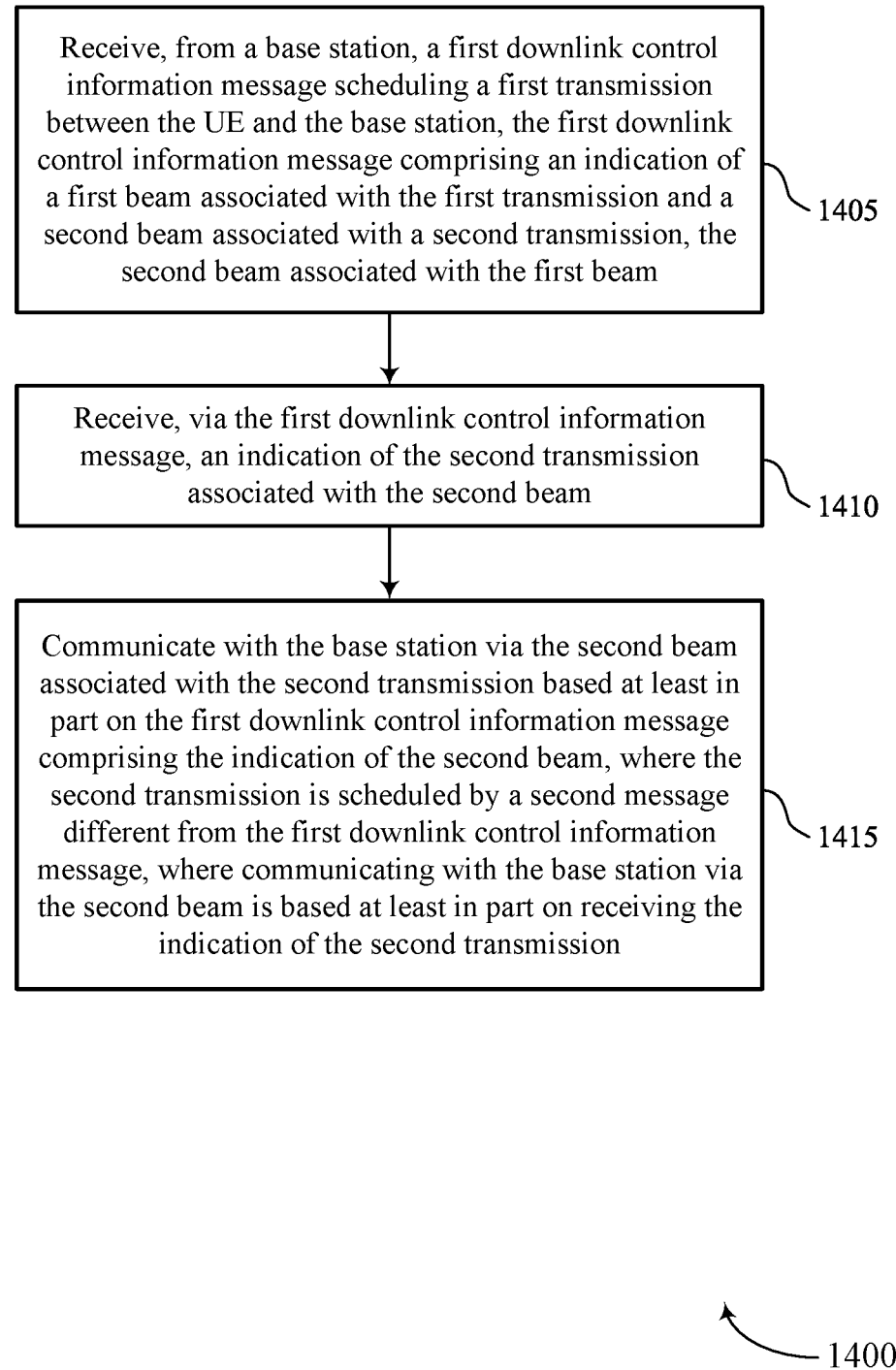

FIG. 14 shows a flowchart illustrating a method 1400 that supports techniques for signaling a common downlink and uplink beam in accordance with aspects of the present disclosure. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1405, the method may include receiving, from a base station, a first DCI message scheduling a first transmission between the UE and the base station, the first DCI message including an indication of a first beam associated with the first transmission and a second beam associated with a second transmission, the second beam associated with the first beam. The operations of 1405 may be performed in accordance with examples as disclosed herein. In some examples, aspects of the operations of 1405 may be performed by a DCI receiving manager 725 as described with reference to FIG. 7.

At 1410, the method may include receiving, via the first DCI message, an indication of the second transmission associated with the second beam. The operations of 1410 may be performed in accordance with examples as disclosed herein. In some examples, aspects of the operations of 1410 may be performed by a DCI receiving manager 725 as described with reference to FIG. 7.

At 1415, the method may include communicating with the base station via the second beam associated with the second transmission based on the first DCI message including the indication of the second beam, where the second transmission is scheduled by a second message different from the first DCI message, where communicating with the base station via the second beam is based on receiving the indication of the second transmission. The operations of 1415 may be performed in accordance with examples as disclosed herein. In some examples, aspects of the operations of 1415 may be performed by a base station communicating manager 730 as described with reference to FIG. 7.

Figure 15:
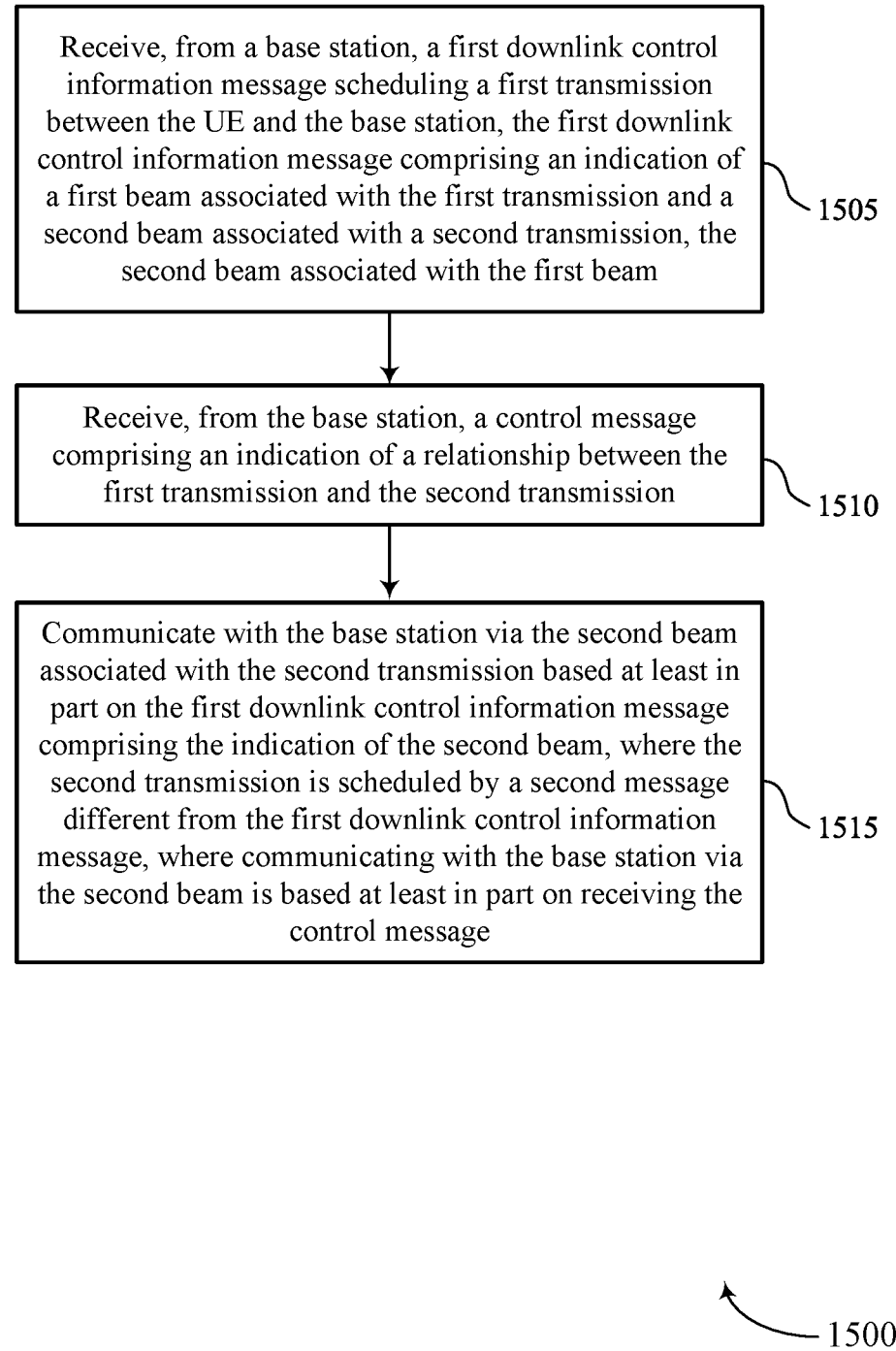

FIG. 15 shows a flowchart illustrating a method 1500 that supports techniques for signaling a common downlink and uplink beam in accordance with aspects of the present disclosure. The operations of the method 1500 may be implemented by a UE or its components as described herein. For example, the operations of the method 1500 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1505, the method may include receiving, from a base station, a first DCI message scheduling a first transmission between the UE and the base station, the first DCI message including an indication of a first beam associated with the first transmission and a second beam associated with a second transmission, the second beam associated with the first beam. The operations of 1505 may be performed in accordance with examples as disclosed herein. In some examples, aspects of the operations of 1505 may be performed by a DCI receiving manager 725 as described with reference to FIG. 7.

At 1510, the method may include receiving, from the base station, a control message including an indication of a relationship between the first transmission and the second transmission. The operations of 1510 may be performed in accordance with examples as disclosed herein. In some examples, aspects of the operations of 1510 may be performed by a control message receiving manager 735 as described with reference to FIG. 7.

At 1515, the method may include communicating with the base station via the second beam associated with the second transmission based on the first DCI message including the indication of the second beam, where the second transmission is scheduled by a second message different from the first DCI message, where communicating with the base station via the second beam is based on receiving the control message. The operations of 1515 may be performed in accordance with examples as disclosed herein. In some examples, aspects of the operations of 1515 may be performed by a base station communicating manager 730 as described with reference to FIG. 7.

Figure 16:
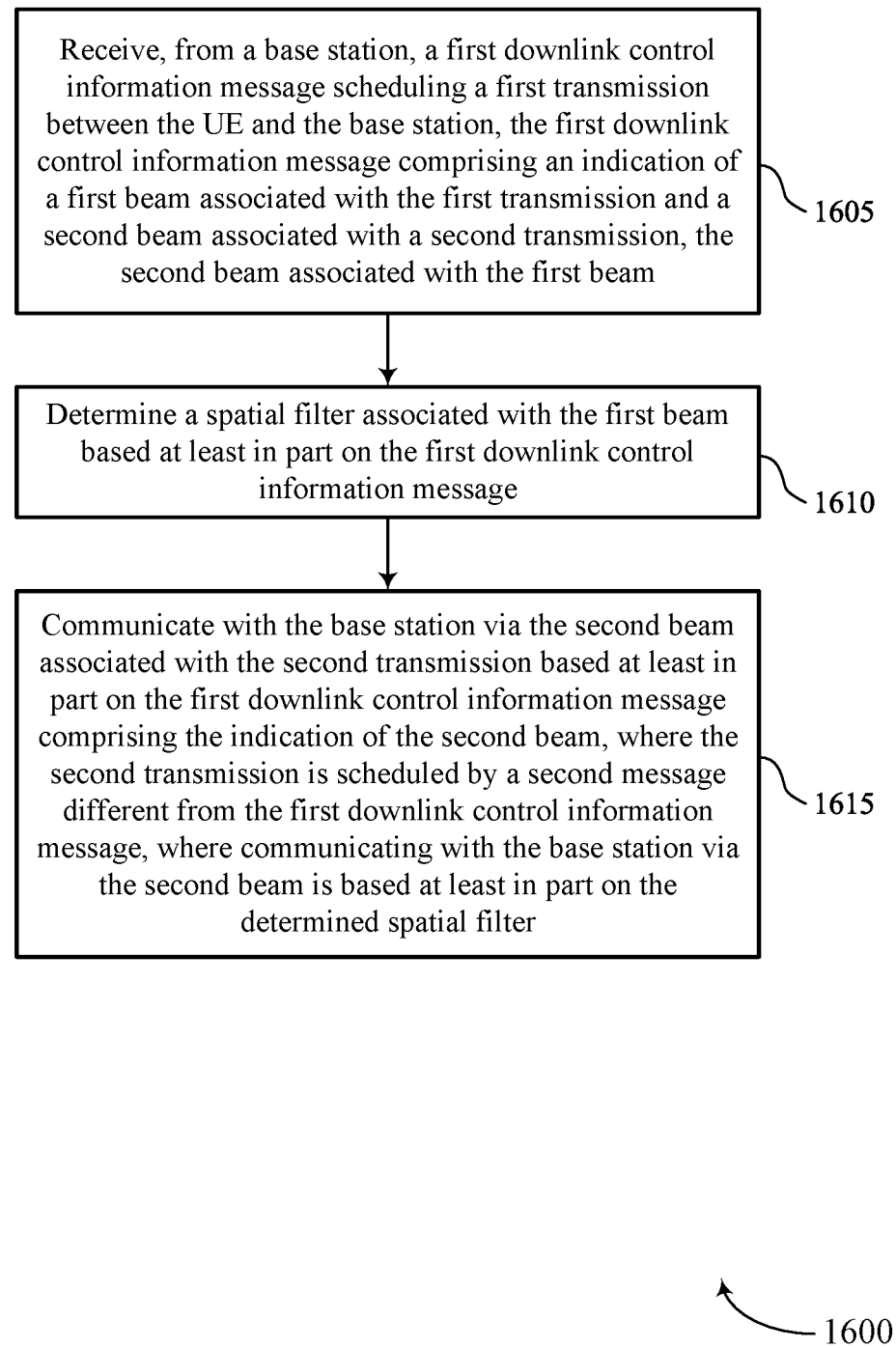

FIG. 16 shows a flowchart illustrating a method 1600 that supports techniques for signaling a common downlink and uplink beam in accordance with aspects of the present disclosure. The operations of the method 1600 may be implemented by a UE or its components as described herein. For example, the operations of the method 1600 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1605, the method may include receiving, from a base station, a first DCI message scheduling a first transmission between the UE and the base station, the first DCI message including an indication of a first beam associated with the first transmission and a second beam associated with a second transmission, the second beam associated with the first beam. The operations of 1605 may be performed in accordance with examples as disclosed herein. In some examples, aspects of the operations of 1605 may be performed by a DCI receiving manager 725 as described with reference to FIG. 7.

At 1610, the method may include determining a spatial filter associated with the first beam based on the first DCI message. The operations of 1610 may be performed in accordance with examples as disclosed herein. In some examples, aspects of the operations of 1610 may be performed by a spatial filter manager 740 as described with reference to FIG. 7.

At 1615, the method may include communicating with the base station via the second beam associated with the second transmission based on the first DCI message including the indication of the second beam, where the second transmission is scheduled by a second message different from the first DCI message, where communicating with the base station via the second beam is based on the determined spatial filter. The operations of 1615 may be performed in accordance with examples as disclosed herein. In some examples, aspects of the operations of 1615 may be performed by a base station communicating manager 730 as described with reference to FIG. 7.

Figure 17:
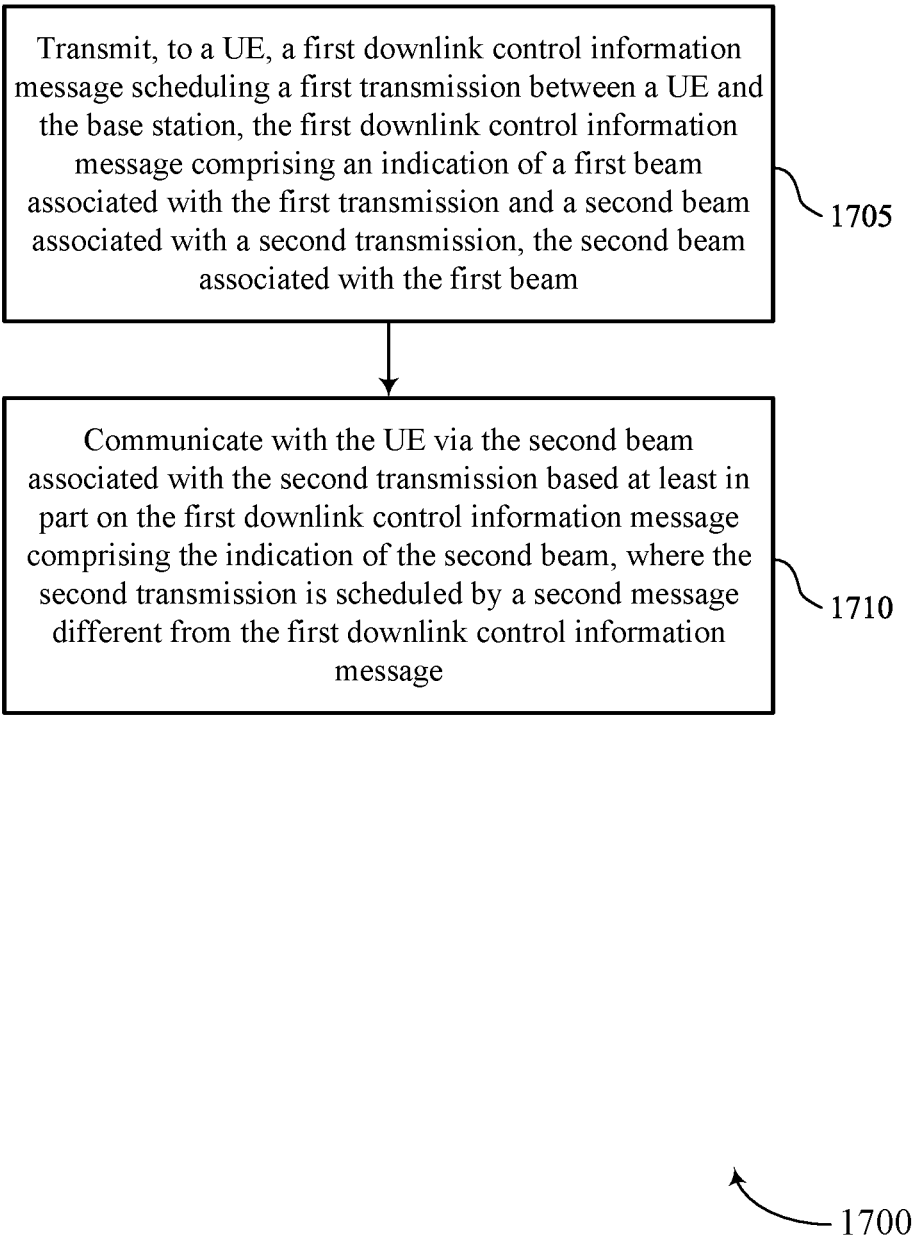

FIG. 17 shows a flowchart illustrating a method 1700 that supports techniques for signaling a common downlink and uplink beam in accordance with aspects of the present disclosure. The operations of the method 1700 may be implemented by a base station or its components as described herein. For example, the operations of the method 1700 may be performed by a base station 105 as described with reference to FIGS. 1 through 4 and 9 through 12. In some examples, a base station may execute a set of instructions to control the functional elements of the base station to perform the described functions. Additionally or alternatively, the base station may perform aspects of the described functions using special-purpose hardware.

At 1705, the method may include transmitting, to a UE, a first DCI message scheduling a first transmission between a UE and the base station, the first DCI message including an indication of a first beam associated with the first transmission and a second beam associated with a second transmission, the second beam associated with the first beam. The operations of 1705 may be performed in accordance with examples as disclosed herein. In some examples, aspects of the operations of 1705 may be performed by a DCI transmitting manager 1125 as described with reference to FIG. 11.

At 1710, the method may include communicating with the UE via the second beam associated with the second transmission based on the first DCI message including the indication of the second beam, where the second transmission is scheduled by a second message different from the first DCI message. The operations of 1710 may be performed in accordance with examples as disclosed herein. In some examples, aspects of the operations of 1710 may be performed by a UE communicating manager 1130 as described with reference to FIG. 11.

The following aspects are given by way of illustration, and provide an overview of aspects of the present disclosure. Examples of the following aspects may be combined with examples or embodiments shown or discussed in relation to the figures or elsewhere herein.

Aspect 1: A method for wireless communication at a UE, comprising: receiving, from a base station, a first DCI message scheduling a first transmission between the UE and the base station, the first DCI message comprising an indication of a first beam associated with the first transmission and a second beam associated with a second transmission, the second beam associated with the first beam; and communicating with the base station via the second beam associated with the second transmission based at least in part on the first DCI message comprising the indication of the second beam, wherein the second transmission is scheduled by a second message different from the first DCI message.

Aspect 2: The method of aspect 1, further comprising: receiving, via the first DCI message, an indication of the second transmission associated with the second beam, wherein communicating with the base station via the second beam is based at least in part on receiving the indication of the second transmission.

Aspect 3: The method of any of aspects 1 through 2, further comprising: receiving, from the base station, a control message comprising an indication of a relationship between the first transmission and the second transmission, wherein communicating with the base station via the second beam is based at least in part on receiving the control message.

Aspect 4: The method of any of aspects 1 through 3, wherein the second transmission comprises a hybrid automatic repeat request response associated with the first transmission.

Aspect 5: The method of any of aspects 1 through 4, wherein the first transmission and the second transmission are scheduled within a common component carrier, within a common bandwidth part, or both.

Aspect 6: The method of any of aspects 1 through 5, wherein the first transmission and the second transmission are scheduled within a common set of component carriers, within a common set of bandwidth parts, or both.

Aspect 7: The method of any of aspects 1 through 6, wherein the indication of the second beam associated with the first beam comprises one or more bit field values within the first DCI message.

Aspect 8: The method of aspect 7, wherein the one or more bit field values comprises a TCI state field.

Aspect 9: The method of any of aspects 1 through 8, further comprising: communicating with the base station via the first beam associated with the first transmission based at least in part on receiving the first DCI message.

Aspect 10: The method of any of aspects 1 through 9, wherein the indication of the second beam associated with the first beam comprises a TCI state associated with the second beam Aspect 11: The method of any of aspects 1 through 10, wherein the first beam and the second beam are associated with a common TCI state.

Aspect 12: The method of any of aspects 1 through 11, wherein the first beam is associated with a first TCI state, and the second beam is associated with a second TCI state different from the first TCI state.

Aspect 13: The method of any of aspects 1 through 12, wherein the first beam is the same as the second beam.

Aspect 14: The method of any of aspects 1 through 13, further comprising: determining a spatial filter associated with the first beam based at least in part on the first DCI message, wherein communicating with the base station via the second beam is based at least in part on the determined spatial filter.

Aspect 15: The method of any of aspects 1 through 14, further comprising: receiving, from the base station, a third DCI message scheduling a third transmission between the UE and the base station; and communicating with the base station via the third transmission based at least in part on the first beam, the second beam, or both, wherein communicating with the base station via the third transmission is based at least in part on receiving the first DCI message, the third DCI message, or both.

Aspect 16: The method of aspect 15, further comprising: determining that the third DCI message does not include a TCI state associated with the third transmission, wherein communicating with the base station via the third transmission is based at least in part on determining that the third DCI message does not include the TCI state associated with the third transmission.

Aspect 17: The method of any of aspects 15 through 16, further comprising: determining that the third transmission and one or more of the first transmission or the second transmission are scheduled in a common set of component carriers, a common set of bandwidth parts, or both, wherein communicating with the base station via the third transmission is based at least in part on determining that the third transmission and one or more of the first transmission or the second transmission are scheduled in the common set of component carriers, the common set of bandwidth parts, or both.

Aspect 18: The method of any of aspects 1 through 17, further comprising: transmitting, to the base station, a capability report indicating a capability of the UE to selectively adjust the second beam scheduled by the second message based at least in part on the first DCI message, wherein communicating with the base station via the second beam is based at least in part on transmitting the capability report.

Aspect 19: The method of any of aspects 1 through 18, further comprising: receiving, from the base station, an indication of a configuration for selectively adjusting beams associated with transmissions via DCI messages which did not schedule the transmissions, wherein communication with the base station via the second beam is based at least in part on receiving the indication of the configuration.

Aspect 20: The method of any of aspects 1 through 19, wherein the first transmission comprises a downlink transmission, and the second transmission comprises an uplink transmission.

Aspect 21: The method of any of aspects 1 through 20, wherein the first transmission comprises an uplink transmission, and the second transmission comprises a downlink transmission.

Aspect 22: The method of any of aspects 1 through 21, wherein the first transmission, the second transmission, or both, comprises one or more of a physical uplink shared channel transmission, a physical uplink control channel transmission, a sounding reference signal, a physical downlink shared channel transmission, or a channel state information reference signal.

Aspect 23: A method for wireless communication at a base station, comprising: transmitting, to a UE, a first DCI message scheduling a first transmission between a UE and the base station, the first DCI message comprising an indication of a first beam associated with the first transmission and a second beam associated with a second transmission, the second beam associated with the first beam; and communicating with the UE via the second beam associated with the second transmission based at least in part on the first DCI message comprising the indication of the second beam, wherein the second transmission is scheduled by a second message different from the first DCI message.

Aspect 24: The method of aspect 23, further comprising: transmitting, via the first DCI message, an indication of the second transmission associated with the second beam, wherein communicating with the UE via the second beam is based at least in part on transmitting the indication of the second transmission.

Aspect 25: The method of any of aspects 23 through 24, further comprising: transmitting, to the UE, a control message comprising an indication of a relationship between the first transmission and the second transmission, wherein communicating with the UE via the second beam is based at least in part on transmitting the control message.

Aspect 26: The method of any of aspects 23 through 25, wherein the second transmission comprises a hybrid automatic repeat request response associated with the first transmission.

Aspect 27: The method of any of aspects 23 through 26, wherein the first transmission and the second transmission are scheduled within a common component carrier, within a common bandwidth part, or both.

Aspect 28: The method of any of aspects 23 through 27, wherein the first transmission and the second transmission are scheduled within a common set of component carriers, within a common set of bandwidth parts, or both.

Aspect 29: The method of any of aspects 23 through 28, wherein the indication of the second beam associated with the first beam comprises one or more bit field values within the first DCI message.

Aspect 30: The method of aspect 29, wherein the one or more bit field values comprises a TCI state field.

Aspect 31: The method of any of aspects 23 through 30, further comprising: communicating with the UE via the first beam associated with the first transmission based at least in part on transmitting the first DCI message.

Aspect 32: The method of any of aspects 23 through 31, wherein the indication of the second beam associated with the first beam comprises a TCI state associated with the second beam Aspect 33: The method of any of aspects 23 through 32, wherein the first beam and the second beam are associated with a common TCI state.

Aspect 34: The method of any of aspects 23 through 33, wherein the first beam is associated with a first TCI state, and the second beam is associated with a second TCI state different from the first TCI state.

Aspect 35: The method of any of aspects 23 through 34, wherein the first beam is the same as the second beam.

Aspect 36: The method of any of aspects 23 through 35, further comprising: determining a spatial filter associated with the first beam based at least in part on the first DCI message, wherein communicating with the UE via the second beam is based at least in part on the determined spatial filter.

Aspect 37: The method of any of aspects 23 through 36, further comprising: transmitting, to the UE, a third DCI message scheduling a third transmission between the UE and the base station; and communicating with the UE via the third transmission based at least in part on the first beam, the second beam, or both, wherein communicating with the UE via the third transmission is based at least in part on transmitting the first DCI message, the third DCI message, or both.

Aspect 38: The method of aspect 37, further comprising: determining that the third DCI message does not include a TCI state associated with the third transmission, wherein communicating with the UE via the third transmission is based at least in part on determining that the third DCI message does not include the TCI state associated with the third transmission.

Aspect 39: The method of any of aspects 37 through 38, further comprising: determining that the third transmission and one or more of the first transmission or the second transmission are scheduled in a common set of component carriers, a common set of bandwidth parts, or both, wherein communicating with the UE via the third transmission is based at least in part on determining that the third transmission and one or more of the first transmission or the second transmission are scheduled in the common set of component carriers, the common set of bandwidth parts, or both.

Aspect 40: The method of any of aspects 23 through 39, further comprising: receiving, from the UE, a capability report indicating a capability of the UE to selectively adjust the second beam scheduled by the second message based at least in part on the first DCI message, wherein communicating with the UE via the second beam is based at least in part on receiving the capability report.

Aspect 41: The method of any of aspects 23 through 40, further comprising: transmitting, to the UE, an indication of a configuration for selectively adjusting beams associated with transmissions via DCI messages which did not schedule the transmissions, wherein communication with the UE via the second beam is based at least in part on transmitting the indication of the configuration.

Aspect 42: The method of any of aspects 23 through 41, wherein the first transmission comprises a downlink transmission, and the second transmission comprises an uplink transmission.

Aspect 43: The method of any of aspects 23 through 42, wherein the first transmission comprises an uplink transmission, and the second transmission comprises a downlink transmission.

Aspect 44: The method of any of aspects 23 through 43, wherein the first transmission, the second transmission, or both, comprises one or more of a physical uplink shared channel transmission, a physical uplink control channel transmission, a sounding reference signal, a physical downlink shared channel transmission, or a channel state information reference signal.

Aspect 45: An apparatus for wireless communication at a UE, comprising a processor; memory coupled with the processor; and instructions stored in the memory and executable by the processor to cause the apparatus to perform a method of any of aspects 1 through 22.

Aspect 46: An apparatus for wireless communication at a UE, comprising at least one means for performing a method of any of aspects 1 through 22.

Aspect 47: A non-transitory computer-readable medium storing code for wireless communication at a UE, the code comprising instructions executable by a processor to perform a method of any of aspects 1 through 22.

Aspect 48: An apparatus for wireless communication at a base station, comprising a processor; memory coupled with the processor; and instructions stored in the memory and executable by the processor to cause the apparatus to perform a method of any of aspects 23 through 44.

Aspect 49: An apparatus for wireless communication at a base station, comprising at least one means for performing a method of any of aspects 23 through 44.

Aspect 50: A non-transitory computer-readable medium storing code for wireless communication at a base station, the code comprising instructions executable by a processor to perform a method of any of aspects 23 through 44.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
    transmitting, to a network entity, a capability report indicating a capability of the UE to support a joint transmission configuration indication state in a first downlink control information message;
    receiving, from the network entity and based at least in part on the capability report, the first downlink control information message scheduling a first transmission between the UE and the network entity, the first downlink control information message comprising an indication of a first beam associated with the first transmission and a second beam associated with a second transmission, the second beam associated with the first beam; and
    communicating with the network entity via the second beam associated with the second transmission based at least in part on the first downlink control information message comprising the indication of the second beam, wherein the second transmission is scheduled by a second message different from the first downlink control information message.

2. The method of claim 1, further comprising:
    receiving, via the first downlink control information message, an indication of the second transmission associated with the second beam, wherein communicating with the network entity via the second beam is based at least in part on receiving the indication of the second transmission.

3. The method of claim 1, further comprising:
    receiving, from the network entity, a control message comprising an indication of a relationship between the first transmission and the second transmission, wherein communicating with the network entity via the second beam is based at least in part on receiving the control message.

4. The method of claim 1, wherein the second transmission comprises a hybrid automatic repeat request response associated with the first transmission.

5. The method of claim 1, wherein the first transmission and the second transmission are scheduled within a common component carrier, within a common bandwidth part, or both.

6. The method of claim 1, wherein the indication of the second beam associated with the first beam comprises one or more bit field values associated with a transmission configuration indication state field within the first downlink control information message.

7. The method of claim 1, wherein:
    the first beam is associated with a first transmission configuration indication state; and
    the second beam is associated with a second transmission configuration indication state different from the first transmission configuration indication state.

8. The method of claim 1, wherein the first beam and the second beam are associated with the joint transmission configuration indication state.

9. The method of claim 1, further comprising:
    determining a spatial filter associated with the first beam based at least in part on the first downlink control information message, wherein communicating with the network entity via the second beam is based at least in part on the determined spatial filter.

10. The method of claim 1, further comprising:
    transmitting, to the network entity, a second capability report indicating a capability of the UE to selectively adjust the second beam scheduled by the second message based at least in part on the first downlink control information message, wherein communicating with the network entity via the second beam is based at least in part on transmitting the second capability report.

11. The method of claim 1, wherein:
    the first transmission comprises a downlink transmission, the first transmission comprising one or more of a physical downlink shared channel transmission or a channel state information reference signal; and
    the second transmission comprises an uplink transmission, the second transmission comprising one or more of a physical uplink shared channel transmission, a physical uplink control channel transmission, or a sounding reference signal.

12. A method for wireless communication at a network entity, comprising:
    receiving, from a user equipment (UE), a capability report indicating a capability of the UE to support a joint transmission configuration indication state in a first downlink control information message;
    transmitting, to the UE and based at least in part on the capability report, the first downlink control information message scheduling a first transmission between the UE and the network entity, the first downlink control information message comprising an indication of a first beam associated with the first transmission and a second beam associated with a second transmission, the second beam associated with the first beam; and
    communicating with the UE via the second beam associated with the second transmission based at least in part on the first downlink control information message comprising the indication of the second beam, wherein the second transmission is scheduled by a second message different from the first downlink control information message.

13. The method of claim 12, further comprising:
transmitting, via the first downlink control information message, an indication of the second transmission associated with the second beam, wherein communicating with the UE via the second beam is based at least in part on transmitting the indication of the second transmission.

14. The method of claim 12, further comprising:
transmitting, to the UE, a control message comprising an indication of a relationship between the first transmission and the second transmission, wherein communicating with the UE via the second beam is based at least in part on transmitting the control message.

15. A user equipment (UE), comprising:
one or more memories storing processor-executable code; and
one or more processors coupled with the one or more memories and individually or collectively operable to execute the code to cause the UE to:
transmit, to a network entity, a capability report indicating a capability of the UE to support a joint transmission configuration indication state in a first downlink control information message;
receive, from the network entity and based at least in part on the capability report, the first downlink control information message scheduling a first transmission between the UE and the network entity, the first downlink control information message comprising an indication of a first beam associated with the first transmission and a second beam associated with a second transmission, the second beam associated with the first beam; and
communicate with the network entity via the second beam associated with the second transmission based at least in part on the first downlink control information message comprising the indication of the second beam, wherein the second transmission is scheduled by a second message different from the first downlink control information message.

16. The UE of claim 15, wherein the one or more processors are individually or collectively further operable to execute the code to cause the UE to:
receive, via the first downlink control information message, an indication of the second transmission associated with the second beam, wherein communicating with the network entity via the second beam is based at least in part on receiving the indication of the second transmission.

17. The UE of claim 15, wherein the one or more processors are individually or collectively further operable to execute the code to cause the UE to:
receive, from the network entity, a control message comprising an indication of a relationship between the first transmission and the second transmission, wherein communicating with the network entity via the second beam is based at least in part on receiving the control message.

18. The UE of claim 15, wherein the second transmission comprises a hybrid automatic repeat request response associated with the first transmission.

19. The UE of claim 15, wherein the first transmission and the second transmission are scheduled within a common component carrier, within a common bandwidth part, or both.

20. The UE of claim 15, wherein the indication of the second beam associated with the first beam comprises one or more bit field values associated with a transmission configuration indication state field within the first downlink control information message.

21. The UE of claim 15, wherein:
the first beam is associated with a first transmission configuration indication state; and
the second beam is associated with a second transmission configuration indication state different from the first transmission configuration indication state.

22. The UE of claim 15, wherein the first beam and the second beam are associated with the joint transmission configuration indication state.

23. The UE of claim 15, wherein the one or more processors are individually or collectively further operable to execute the code to cause the UE to:
determine a spatial filter associated with the first beam based at least in part on the first downlink control information message, wherein communicating with the network entity via the second beam is based at least in part on the determined spatial filter.

24. The UE of claim 15, wherein the one or more processors are individually or collectively further operable to execute the code to cause the UE to:
transmit, to the network entity, a second capability report indicating a capability of the UE to selectively adjust the second beam scheduled by the second message based at least in part on the first downlink control information message, wherein communicating with the network entity via the second beam is based at least in part on transmitting the second capability report.

25. The UE of claim 15, wherein:
the first transmission comprises a downlink transmission, the first transmission comprising one or more of a physical downlink shared channel transmission or a channel state information reference signal; and
the second transmission comprises an uplink transmission, the second transmission comprising one or more of a physical uplink shared channel transmission, a physical uplink control channel transmission, or a sounding reference signal.

26. A network entity, comprising:
one or more memories storing processor-executable code; and
one or more processors coupled with the one or more memories and individually or collectively operable to execute the code to cause the network entity to:
receive, from a user equipment (UE), a capability report indicating a capability of the UE to support a joint transmission configuration indication state in a first downlink control information message;
transmit, to the UE and based at least in part on the capability report, the first downlink control information message scheduling a first transmission between the UE and the network entity,
the first downlink control information message comprising an indication of a first beam associated with the first transmission and a second beam associated with a second transmission, the second beam associated with the first beam; and
communicate with the UE via the second beam associated with the second transmission based at least in part on the first downlink control information message comprising the indication of the second beam, wherein the second transmission is scheduled by a second message different from the first downlink control information message.

27. The network entity of claim 26, wherein the one or more processors are individually or collectively further operable to execute the code to cause the network entity to:
transmit, via the first downlink control information message, an indication of the second transmission associated with the second beam, wherein communicating with the UE via the second beam is based at least in part on transmitting the indication of the second transmission.

28. The network entity of claim 26, wherein the one or more processors are individually or collectively further operable to execute the code to cause the network entity to:
transmit, to the UE, a control message comprising an indication of a relationship between the first transmission and the second transmission, wherein communicating with the UE via the second beam is based at least in part on transmitting the control message.

* * * * *